US011777584B2

(12) United States Patent
Sakhnini et al.

(10) Patent No.: US 11,777,584 B2
(45) Date of Patent: Oct. 3, 2023

(54) MEASUREMENT REPORT PAYLOAD REDUCTION TECHNIQUES

(71) Applicant: QUALCOMM Incorporated, San Diego, CA (US)

(72) Inventors: Iyab Issam Sakhnini, San Diego, CA (US); Tao Luo, San Diego, CA (US); Qiang Wu, San Diego, CA (US); Wooseok Nam, San Diego, CA (US); Yan Zhou, San Diego, CA (US); Juan Montojo, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 131 days.

(21) Appl. No.: 17/316,340

(22) Filed: May 10, 2021

(65) Prior Publication Data
US 2021/0351833 A1    Nov. 11, 2021

Related U.S. Application Data

(60) Provisional application No. 63/023,175, filed on May 11, 2020.

(51) Int. Cl.
*H04B 7/06* (2006.01)
*H04W 16/28* (2009.01)
*H04W 24/10* (2009.01)

(52) U.S. Cl.
CPC .......... *H04B 7/0695* (2013.01); *H04W 16/28* (2013.01); *H04W 24/10* (2013.01)

(58) Field of Classification Search
CPC ..... H04B 7/0695; H04W 16/28; H04W 24/10
See application file for complete search history.

(56) References Cited

U.S. PATENT DOCUMENTS

2018/0091992 A1*  3/2018  Frenne ............... H04W 72/082
2020/0059921 A1*  2/2020  Karjalainen ...... H04W 72/0413
(Continued)

OTHER PUBLICATIONS

Apple Inc : "Consideration on Beam Measurement and Reporting Enhancement", 3GPP Draft, 3GPP TSG RAN WG1 Ad-Hoc Meeting 1901, R1-1900750, Consideration on Beam Measurement and Reporting Enhancement, 3rd Generation Partnership Project (3GPP), Mobile Competence Centre, 650, Route Des Lucioles, F-06921, Sophia-Antipolis Cedex, France, vol. RAN WG1, No. Taipei, Taiwan, Jan. 21, 2019-Jan. 25, 2019, Jan. 20, 2019 (Jan. 20, 2019), XP051593597, 8 pages, Retrieved from the Internet: URL: http://www.3gpp.org/ftp/Meetings%5F3GPP%5FSYNC/RAN1/Docs/R1%2D1900750%2Ezip [retrieved on Jan. 20, 2019] pp. 1, 2.
(Continued)

*Primary Examiner* — Anh Ngoc M Nguyen
(74) *Attorney, Agent, or Firm* — Loza & Loza LLP

(57) ABSTRACT

Aspects relate to configuration of a Layer 1 (L1) measurement report. A radio access network (RAN) node (e.g., a base station) can transmit at least one report setting, each associated with a selected information type, to a wireless communication device (e.g., a UE). The selected information type may be selected from a first information type and a second information type. When a report setting is associated with the first information type, the wireless communication device can transmit the L1 measurement report including both beam measurements and beam identifiers corresponding to the beam measurements for the report setting. When the report setting is associated with the second information type, the wireless communication device can exclude the beam identifiers from the L1 measurement report including the beam measurements for the report setting. Other aspects, features, and examples are also claimed and described.

29 Claims, 19 Drawing Sheets

(56) References Cited

U.S. PATENT DOCUMENTS

2020/0100129 A1* 3/2020 Sun ................... H04W 72/046
2022/0295525 A1* 9/2022 Yamamoto ............ H04L 5/0026

OTHER PUBLICATIONS

International Search Report and Written Opinion—PCT/US2021/031830—ISA/EPO—dated Aug. 27, 2021.

VIVO: "Discussion on Beam Measurement and Reporting," 3GPP Draft, 3GPP TSG RAN WG1 #94bis, R1-1810408_Discussion on Beam Measurement and Reporting, 3RD Generation Partnership Project (3GPP), Mobile Competence Centre, 650, Route Des Lucioles, F-06921, Sophia-Antipolis Cedex, France, vol. Ran WG1, No. Chengdu, China, Oct. 8, 2018-Oct. 12, 2018, Sep. 29, 2018 (Sep. 29, 2018), XP051517817, 2 pages, Retrieved from the Internet: URL: http://www.3gpp.org/ftp/tsg%5Fran/WG1%5FRL1/TSGR1%5F94b/Docs/R1%2D1810408%2Ezip [retrieved on Sep. 29, 2018] section 3, figure 1.

* cited by examiner

MEASUREMENT REPORT PAYLOAD REDUCTION TECHNIQUES

CROSS-REFERENCE TO RELATED APPLICATIONS

The present application for patent claims priority to and the benefit of pending U.S. Provisional Application No. 63/023,175, filed May 11, 2020, and assigned to the assignee hereof and hereby expressly incorporated by reference herein as if fully set forth below in its entirety and for all applicable purposes.

TECHNICAL FIELD

The technology discussed below relates generally to wireless communication networks, and more particularly, to measurement reports in non-beam-based and beam-based communication scenarios (e.g., millimeter wave beams). Some examples and techniques enable and provide communication devices, methods, and systems configured with techniques for strategically configuring measurement reports (e.g., sizing measurement reports for desired payload sizes, payload configuration modifications, and/or payload reduction). Deployments can include devices having reduced capabilities and/or lower transmission capabilities relative to other communication devices.

INTRODUCTION

In wireless communication systems, such as those specified under standards for 5G New Radio (NR), a base station and user equipment (UE) may utilize beamforming to compensate for high path loss and short range. Beamforming is a signal processing technique used with an antenna array for directional signal transmission and/or reception. Antennas in the antenna array can transmit a signal that is combined with other signals of other antennas of the same array in such a way that signals at particular angles experience constructive interference while others experience destructive interference. The collective impact of interference may alter signal shape for transmit and/or receive purposes.

To select one or more beams for communication between a base station and a UE, the base station may transmit a reference signal, such as a synchronization signal block (SSB) or a channel state information (CSI) reference signal (CSI-RS), on a plurality of beams in a beam sweeping manner. The UE can transmit information in response to the reference signal to aid the BS in channel estimation for subsequent signaling or transmissions.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

Various aspects of the disclosure relate to configuration of a measurement report (e.g., a Layer 1 (L1) measurement report). A radio access network (RAN) node (e.g., a base station) can transmit at least one report setting, each associated with a selected information type, to a wireless communication device (e.g., a UE). The selected information type may be selected from a first information type and a second information type. When a report setting is associated with the first information type, the wireless communication device can transmit the L1 measurement report including both beam measurements and beam identifiers corresponding to the beam measurements for the report setting. When the report setting is associated with the second information type, the wireless communication device can exclude the beam identifiers from the L1 measurement report including the beam measurements of the report setting. Therefore, L1 measurement reports including beam measurements for report settings of the second information type have a reduced payload in comparison to L1 measurement reports including beam measurements for report settings of the first information type.

In one example, a method for wireless communication at a wireless communication device in a wireless communication network is disclosed. The method can include receiving at least one report setting for a measurement report from a radio access network (RAN) node, each of the at least one report setting associated with a respective information type of at least a first information type or a second information type. The method can further include transmitting the measurement report to the RAN node. The measurement report can include first beam measurement information including first beam measurements, each corresponding to one of a first set of a plurality of beams configured for communication with the RAN node. The measurement report can further selectively include a respective beam identifier corresponding to each of the first beam measurements based on the information type for a first report setting of the at least one report setting.

Another example provides a wireless communication device in a wireless communication network including a transceiver, a memory, and a processor communicatively coupled to the transceiver and the memory. The processor and the memory can be configured to receive at least one report setting for a measurement report from a radio access network (RAN) node via the transceiver, each of the at least one report setting associated with a respective information type of at least a first information type or a second information type. The processor and the memory can further be configured to transmit the measurement report to the RAN node via the transceiver. The measurement report can include first beam measurement information including first beam measurements, each corresponding to one of a first set of a plurality of beams configured for communication with the RAN node. The measurement report can further selectively include a respective beam identifier corresponding to each of the first beam measurements based on the information type for a first report setting of the at least one report setting.

Another example provides a wireless communication device in a wireless communication network. The wireless communication device can include means for receiving at least one report setting for a measurement report from a radio access network (RAN) node, each of the at least one report setting associated with a respective information type of at least a first information type or a second information type. The wireless communication device can further include means for transmitting the measurement report to the RAN node. The measurement report can include first beam measurement information including first beam measurements, each corresponding to one of a first set of a plurality of beams configured for communication with the RAN node. The measurement report can further selectively include a respective beam identifier corresponding to each of the first beam measurements based on the information type for a first report setting of the at least one report setting.

Another example provides a non-transitory computer-readable medium having stored therein instructions executable by one or more processors of a wireless communication device to receive at least one report setting for a measurement report from a radio access network (RAN) node, each of the at least one report setting associated with a respective information type of at least a first information type or a second information type. The non-transitory computer-readable medium may further include instructions executable by the one or more processors of the wireless communication device to transmit the measurement report to the RAN node. The measurement report can include first beam measurement information including first beam measurements, each corresponding to one of a first set of a plurality of beams configured for communication with the RAN node. The measurement report can further selectively include a respective beam identifier corresponding to each of the first beam measurements based on the information type for a first report setting of the at least one report setting.

In another example, a method for wireless communication at a radio access network (RAN) node in a wireless communication network is disclosed. The method can include transmitting at least one report setting for a measurement report to a wireless communication device, each of the at least one report setting associated with a respective information type selected from at least a first information type or a second information type. The method can further include receiving the measurement report based on the information type for a first report setting of the at least one report setting from the wireless communication device. The measurement report can include first beam measurement information including first beam measurements, each corresponding to one of a first set of a plurality of beams configured for communication with the wireless communication device. The measurement report can further selectively include a respective beam identifier corresponding to each of the first beam measurements based on the information type of the first report setting.

Another example provides a radio access network (RAN) node in a wireless communication network including a transceiver, a memory, and a processor communicatively coupled to the transceiver and the memory. The processor and the memory can be configured to transmit at least one report setting for a measurement report to a wireless communication device via the transceiver, each of the at least one report setting associated with a respective information type selected from at least a first information type or a second information type. The processor and the memory can further be configured to receive the measurement report based on the information type for a first report setting of the at least one report setting from the wireless communication device via the transceiver. The measurement report can include first beam measurement information including first beam measurements, each corresponding to one of a first set of a plurality of beams configured for communication with the wireless communication device. The measurement report can further selectively include a respective beam identifier corresponding to each of the first beam measurements based on the information type of the first report setting.

Another example provides a radio access network (RAN) node in a wireless communication network. The RAN node can include means for transmitting at least one report setting for a measurement report to a wireless communication device, each of the at least one report setting associated with a respective information type selected from at least a first information type or a second information type. The RAN node can further include means for receiving the measurement report based on the information type for a first report setting of the at least one report setting from the wireless communication device. The measurement report can include first beam measurement information including first beam measurements, each corresponding to one of a first set of a plurality of beams configured for communication with the wireless communication device. The measurement report can further selectively include a respective beam identifier corresponding to each of the first beam measurements based on the information type of the first report setting.

Another example provides a non-transitory computer-readable medium having stored therein instructions executable by one or more processors of a radio access network (RAN) node to transmit at least one report setting for a measurement report to a wireless communication device, each of the at least one report setting associated with a respective information type selected from at least a first information type or a second information type. The non-transitory computer-readable medium can further include instructions executable by the one or more processors of the RAN node to receive the measurement report based on the information type for a first report setting of the at least one report setting from the wireless communication device. The measurement report can include first beam measurement information including first beam measurements, each corresponding to one of a first set of a plurality of beams configured for communication with the wireless communication device. The measurement report can further selectively include a respective beam identifier corresponding to each of the first beam measurements based on the information type of the first report setting.

Another example provides a method for wireless communication at a wireless communication device in a wireless communication network. The method can include receiving at least one report setting for a Layer 1 (L1) measurement report from a radio access network (RAN) node. Each of the at least one report setting can include a respective selected information type selected from a first information type and a second information type. The method can further include obtaining first beam measurement information including first beam measurements based on a first report setting of the at least one report setting. Each of the first beam measurements can correspond to one of a first set of a plurality of beams utilized for communication with the RAN node. The method can further include transmitting the L1 measurement report including the first beam measurement information to the RAN node based on the selected information type for the first report setting. The L1 measurement report can further include a respective beam identifier corresponding to each of the first beam measurements in response to the selected information type for the first report setting including the first information type. The L1 measurement report can exclude the respective beam identifier corresponding to each of the first beam measurements in response to the selected information type for the first report setting including the second information type.

Another example provides a wireless communication device in a wireless communication network including a transceiver, a memory, and a processor communicatively coupled to the transceiver and the memory. The processor and the memory can be configured to receive at least one report setting for a Layer 1 (L1) measurement report from a radio access network (RAN) node. Each of the at least one report setting can include a respective selected information type selected from a first information type and a second information type. The processor and the memory can further be configured to obtain first beam measurement information including first beam measurements based on a first report setting of the at least one report setting. Each of the first beam measurements can correspond to one of a first set of a plurality of beams utilized for communication with the RAN node. The processor and the memory can further be configured to transmit the L1 measurement report including the first beam measurement information to the RAN node based on the selected information type for the first report setting. The L1 measurement report can further include a respective beam identifier corresponding to each of the first beam measurements in response to the selected information type for the first report setting including the first information type. The L1 measurement report can exclude the respective beam identifier corresponding to each of the first beam measurements in response to the selected information type for the first report setting including the second information type.

Another example provides a wireless communication device in a wireless communication network. The wireless communication device can include means for receiving at least one report setting for a Layer 1 (L1) measurement report from a radio access network (RAN) node. Each of the at least one report setting can include a respective selected information type selected from a first information type and a second information type. The wireless communication device can further include means for obtaining first beam measurement information including first beam measurements based on a first report setting of the at least one report setting. Each of the first beam measurements can correspond to one of a first set of a plurality of beams utilized for communication with the RAN node. The wireless communication device can further include means for transmitting the L1 measurement report including the first beam measurement information to the RAN node based on the selected information type for the first report setting. The L1 measurement report can further include a respective beam identifier corresponding to each of the first beam measurements in response to the selected information type for the first report setting including the first information type. The L1 measurement report can exclude the respective beam identifier corresponding to each of the first beam measurements in response to the selected information type for the first report setting including the second information type.

Another example provides a non-transitory computer-readable medium having stored therein instructions executable by one or more processors of a wireless communication device to receive at least one report setting for a Layer 1 (L1) measurement report from a radio access network (RAN) node. Each of the at least one report setting can include a respective selected information type selected from a first information type and a second information type. The non-transitory computer-readable medium may further include instructions executable by the one or more processors of the wireless communication device to obtain first beam measurement information including first beam measurements based on a first report setting of the at least one report setting. Each of the first beam measurements can correspond to one of a first set of a plurality of beams utilized for communication with the RAN node. The non-transitory computer-readable medium can further include instructions executable by the one or more processors of the wireless communication device to transmit the L1 measurement report including the first beam measurement information to the RAN node based on the selected information type for the first report setting. The L1 measurement report can further include a respective beam identifier corresponding to each of the first beam measurements in response to the selected information type for the first report setting including the first information type. The L1 measurement report can exclude the respective beam identifier corresponding to each of the first beam measurements in response to the selected information type for the first report setting including the second information type.

In another example, a method for wireless communication at a radio access network (RAN) node in a wireless communication network is disclosed. The method can include transmitting at least one report setting for a Layer 1 (L1) measurement report to a wireless communication device. Each of the at least one report setting is associated with a respective selected information type selected from a first information type and a second information type. The method can further include receiving the L1 measurement report based on the selected information type for a first report setting of the at least one report setting from the wireless communication device. The L1 measurement report can include first beam measurement information including first beam measurements, each corresponding to one of a first set of a plurality of beams utilized for communication with the wireless communication device. The L1 measurement report can further include a respective beam identifier corresponding to each of the first beam measurements in response to the selected information type for the first report setting including the first information type. The L1 measurement report can further exclude the respective beam identifier corresponding to each of the first beam measurements in response to the selected information type for the first report setting including the second information type.

Another example provides a radio access network (RAN) node in a wireless communication network including a transceiver, a memory, and a processor communicatively coupled to the transceiver and the memory. The processor and the memory can be configured to transmit at least one report setting for a Layer 1 (L1) measurement report to a wireless communication device. Each of the at least one report setting is associated with a respective selected information type selected from a first information type and a second information type. The processor and the memory can be further configured to receive the L1 measurement report based on the selected information type for a first report setting of the at least one report setting from the wireless communication device. The L1 measurement report can include first beam measurement information including first beam measurements, each corresponding to one of a first set of a plurality of beams utilized for communication with the wireless communication device. The L1 measurement report can further include a respective beam identifier corresponding to each of the first beam measurements in response to the selected information type for the first report setting including the first information type. The L1 measurement report can further exclude the respective beam identifier corresponding to each of the first beam measurements in response to the selected information type for the first report setting including the second information type.

Another example provides a radio access network (RAN) node in a wireless communication network. The RAN node can include means for transmitting at least one report setting for a Layer 1 (L1) measurement report to a wireless communication device. Each of the at least one report setting is associated with a respective selected information type selected from a first information type and a second information type. The RAN node can further include means for receiving the L1 measurement report based on the selected information type for a first report setting of the at least one report setting from the wireless communication device. The L1 measurement report can include first beam measurement information including first beam measurements, each corresponding to one of a first set of a plurality of beams utilized for communication with the wireless communication device. The L1 measurement report can further include a respective beam identifier corresponding to each of the first beam measurements in response to the selected information type for the first report setting including the first information type. The L1 measurement report can further exclude the respective beam identifier corresponding to each of the first beam measurements in response to the selected information type for the first report setting including the second information type.

Another example provides a non-transitory computer-readable medium having stored therein instructions executable by one or more processors of a radio access network (RAN) node to transmit at least one report setting for a Layer 1 (L1) measurement report to a wireless communication device. Each of the at least one report setting is associated with a respective selected information type selected from a first information type and a second information type. The non-transitory computer-readable medium can further include instructions executable by the one or more processors of the RAN node to receive the L1 measurement report based on the selected information type for a first report setting of the at least one report setting from the wireless communication device. The L1 measurement report can include first beam measurement information including first beam measurements, each corresponding to one of a first set of a plurality of beams utilized for communication with the wireless communication device. The L1 measurement report can further include a respective beam identifier corresponding to each of the first beam measurements in response to the selected information type for the first report setting including the first information type. The L1 measurement report can further exclude the respective beam identifier corresponding to each of the first beam measurements in response to the selected information type for the first report setting including the second information type.

Various method, system, device, and apparatus examples may also include additional features. For example, the wireless communication device can further be configured to obtain second beam measurement information including second beam measurements based on a second report setting of the at least one report setting. Each of the second beam measurements can correspond to one of a second set of the plurality of beams. The wireless communication device can further be configured to include the second beam measurement information in the L1 measurement report.

In some examples, the L1 measurement report can include the first beam measurement information and the respective beam identifier corresponding to each of the first beam measurements in response to the selected information type for the first report setting being the first information type. In some examples, the L1 measurement report can further include the second beam measurement information and exclude the respective beam identifier corresponding to each of the second beam measurements in response to the selected information type for the second report setting being the second information type. In some examples, the L1 measurement report can include the first beam measurement information and exclude the respective beam identifier corresponding to each of the first beam measurements in response to the selected information type for the first report setting including the second information type. In addition, the L1 measurement report can further include the second beam measurement information and the respective beam identifier corresponding to each of the second beam measurements in response to the selected information type for the second report setting including the first information type. In some examples, the L1 measurement report includes the first beam measurement information and the second beam measurement information in response to the selected information type for each of the first report setting and the second report setting being the same.

In some examples, the L1 measurement report can further include a respective type indicator corresponding to the respective selected information type for each of the first report setting and the second report setting in response to the respective selected information type for each of the first report setting and the second report setting being different. In some examples, the L1 measurement report further includes a type indicator corresponding to the respective selected information type for each of the first report setting and the second report setting in response to the respective selected information type for each of the first report setting and the second report setting being the same. In some examples, the RAN node may further be configured to blind detect the selected information type of the L1 measurement report.

In some examples, the L1 measurement report is a periodic L1 measurement report or a semi-persistent L1 measurement report. In some examples, the first beam measurements in the first beam measurement information are arranged in a first order of the respective beam identifiers. The first order can include a same order as a previous L1 measurement report or a previous report setting of the previous L1 measurement report in response to the selected information type associated with the L1 measurement report being the second information type. In some examples, the absolute beam measurements include an exact value for a highest beam measurement of the first beam measurements and a respective differential value with respect to the exact value for each remaining beam measurement of the first beam measurements.

In some examples, the first beam measurements in the first beam measurement information include differential beam measurements with respect to a previous L1 measurement report or a previous report setting of the previous L1 measurement report. In some examples, the previous L1 measurement report includes additional differential beam measurements with respect to another previous L1 measurement report or another previous report setting. In some examples, the previous L1 measurement report includes absolute beam measurements.

In some examples, the L1 measurement report is an aperiodic L1 measurement report. In some examples, the wireless communication device may further be configured to receive report information associated with the first report setting from the RAN node. In some examples, the report information can indicate a first arrangement of the first beam measurements in the L1 measurement report in a designated order of the respective beam identifiers. In some examples, the report information can indicate a second arrangement of the first beam measurements in the L1 measurement report in a same order of the respective beam identifiers as a previous L1 measurement report or a previous report setting of the previous L1 measurement report.

In some examples, the wireless communication device may further be configured to measure a reference signal on each of the first set of the plurality of beams to obtain the first beam measurement information. The respective beam identifier for each respective beam of the first set of the plurality of beams can include a reference signal resource indicator associated with the reference signal and the respective beam. In some examples, the reference signal includes a synchronization signal block (SSB) or a channel state information (CSI) reference signal (CSI-RS). In some examples, the first beam measurement information includes a respective reference signal received power (RSRP) measurement for each of the first set of the plurality of beams or a respective signal-to-interference-plus-noise (SINR) measurement for each of the first set of the plurality of beams.

These and other aspects will become more fully understood upon a review of the detailed description, which follows. Other aspects, features, and examples will become apparent to those of ordinary skill in the art, upon reviewing the following description of specific, exemplary examples of in conjunction with the accompanying figures. While features may be discussed relative to certain examples and figures below, all examples can include one or more of the advantageous features discussed herein. In other words, while one or more examples may be discussed as having certain advantageous features, one or more of such features may also be used in accordance with the various examples discussed herein. In similar fashion, while exemplary examples may be discussed below as device, system, or method examples such exemplary examples can be implemented in various devices, systems, and methods.

DETAILED DESCRIPTION

Figure 1:
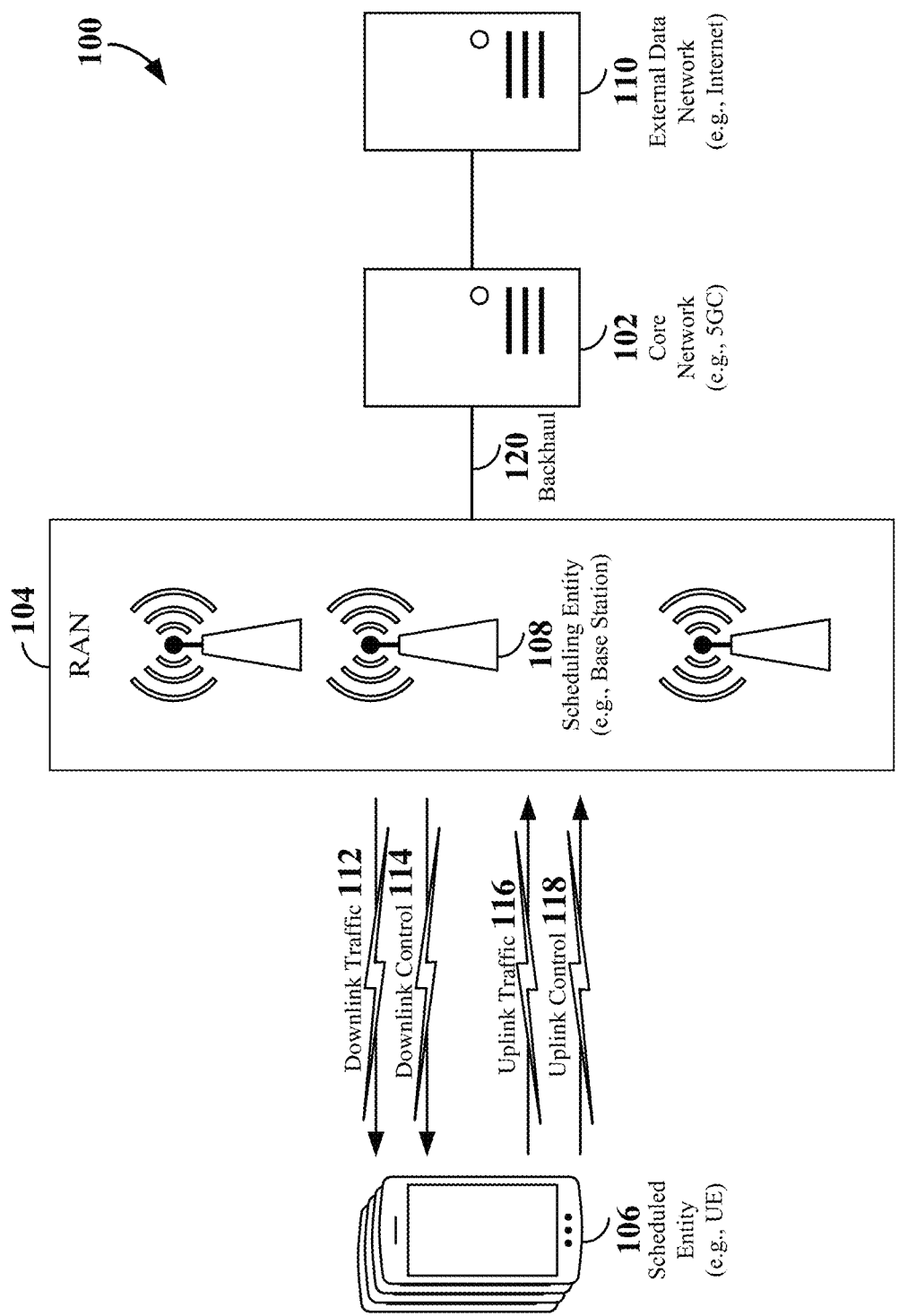
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4-a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

It should be understood that the above examples are not necessarily intended to limit claimed subject matter. For example, unless specifically recited, claimed subject matter relating to wireless communications is not necessarily intended to be limited to any particular author/entity defined frequency band, or the like.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or dis-aggregated scenarios, end-user devices, etc. of varying sizes, shapes and constitution.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long Term Evolution (LTE). The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 104 operates according to both the LTE and 5G NR standards, one of the base stations may be an LTE base station, while another base station may be a 5G NR base station.

The RAN 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present disclosure, a "mobile" apparatus need not necessarily have a capability to move and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT).

A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, and/or agricultural equipment, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Fifth generation (5G) wireless communication networks, such as the New Radio (NR) wireless communication network, support communication between a base station 108 and high-end UEs 106 for a plurality of different usage cases, including, for example, enhanced mobile broadband (eMBB) and ultra-reliable and low latency communication (URLLC). NR networks may further support communication between a base station and low-end UEs 106 in massive machine-type communication (mMTC) usage cases. In some examples, LTE-M or Narrowband Internet of Things (NB-IoT) technology may be utilized to meet the requirements of mMTC.

In addition to providing services to high-end UEs 106 (e.g., via eMMB and/or URLLC) and low-end UEs 106 (e.g., via mMTC), NR networks may further provide services to reduced capability UEs 106. The service requirements for reduced capability UEs may be less than high-end UEs, but greater than low-end UEs. For example, use cases for reduced capability UEs may include not only URLLC services with high requirements, but also low-end services to accommodate smaller form factors and longer battery lives. Examples of reduced-capability UEs may include, but are not limited to, industrial wireless sensors, surveillance cameras, and wearable devices (e.g., smart watches, rings, eHealth related devices, and medical monitoring devices). In general, reduced capability UEs have a device design with a compact form factor and reduced complexity as compared to high-end UEs. For example, reduced capability UEs may have a reduced number of transmit/receive antennas, reduced device bandwidth (e.g., reduced operating bandwidth of the UE), relaxed processing time, and/or relaxed processing capability. Reduced capability UEs may further be configured for power saving and battery lifetime enhancement in delay tolerant use cases.

The particular services (e.g., eMBB/URLLC/mMTC/reduced capability) provided to a UE may be determined based on a UE category of the UE. UE category information is used to enable the base station to effectively communicate with each UE served by the base station. For example, the UE category may identify the uplink and downlink performance capability of the UE. As an example, the UE category may specify the maximum data rate supported by the UE, the number of component carriers and multiple-input multiple-output (MIMO) layers supported by the UE, and/or the highest modulation supported by the UE. The examples presented herein of UE category differentiators are merely exemplary, and it should be understood that any suitable differences between UE features, whether in hardware or software, may be utilized to differentiate between UE categories.

Wireless communication between the RAN 104 and the UE 106 may be described as utilizing an air interface. Transmissions over the air interface from a base station (e.g., base station 108) to one or more UEs (e.g., similar to UE 106) may be referred to as downlink (DL) transmission. In accordance with certain aspects of the present disclosure, the term downlink may refer to a point-to-multipoint transmission originating at a base station (e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a UE (e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities (e.g., UEs 106). That is, for scheduled communication, a plurality of UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs). For example, UEs may communicate directly with other UEs in a peer-to-peer or device-to-device fashion and/or in a relay configuration.

As illustrated in FIG. 1, a scheduling entity 108 may broadcast downlink traffic 112 to one or more scheduled entities (e.g., one or more UEs 106). Broadly, the scheduling entity 108 is a node or device responsible for scheduling traffic in a wireless communication network, including the downlink traffic 112 and, in some examples, uplink traffic 116 from one or more scheduled entities (e.g., one or more UEs 106) to the scheduling entity 108. On the other hand, the scheduled entity (e.g., a UE 106) is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be transmitted on a waveform that may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system 100. The backhaul portion 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100 and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
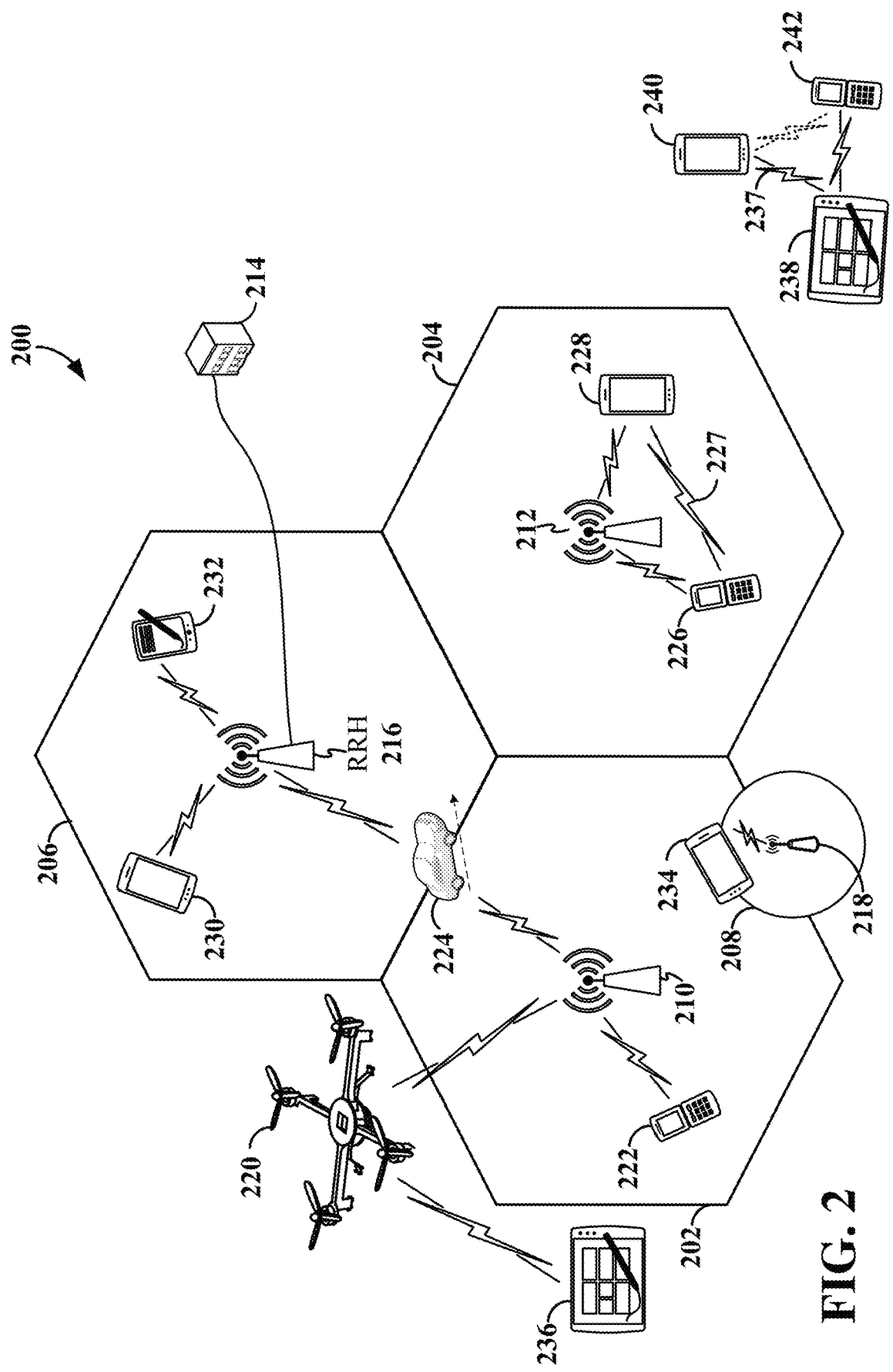
FIG. 2 is a conceptual illustration of an example of a radio access network according to some aspects.

Referring now to FIG. 2, as an illustrative example without limitation, a schematic illustration of a radio access network (RAN) 200 according to some aspects of the present disclosure is provided. In some examples, the RAN 200 may be the same as the RAN 104 described above and illustrated in FIG. 1.

The geographic region covered by the RAN 200 may be divided into a number of cellular regions (cells) that can be uniquely identified by a user equipment (UE) based on an identification broadcasted over a geographical area from one access point or base station. FIG. 2 illustrates cells 202, 204, 206, and 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations, base station 210 and base station 212 are shown in cells 202 and 204. A third base station, base station 214 is shown controlling a remote radio head (RRH) 216 in cell 206. That is, a base station can have an integrated antenna or can be connected to an antenna or RRH 216 by feeder cables. In the illustrated example, cells 202, 204, and 206 may be referred to as macrocells, as the base stations 210, 212, and 214 support cells having a large size. Further, a base station 218 is shown in the cell 208, which may overlap with one or more macrocells. In this example, the cell 208 may be referred to as a small cell (e.g., a microcell, picocell, femtocell, home base station, home Node B, home eNode B, etc.), as the base station 218 supports a cell having a relatively small size. Cell sizing can be done according to system design as well as component constraints.

It is to be understood that the RAN 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as or similar to the scheduling entity 108 described above and illustrated in FIG. 1.

FIG. 2 further includes an unmanned aerial vehicle (UAV) 220, which may be a drone or quadcopter. The UAV 220 may be configured to function as a base station, or more specifically as a mobile base station. That is, in some examples, a cell may not necessarily be stationary, and the geographic area of the cell may move according to the location of a mobile base station, such as the UAV 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as or similar to the UE/scheduled entity 106 described above and illustrated in FIG. 1. In some examples, the UAV 220 (e.g., the quadcopter) can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. Sidelink communication may be utilized, for example, in a device-to-device (D2D) network, peer-to-peer (P2P) network, vehicle-to-vehicle (V2V) network, vehicle-to-everything (V2X) network, and/or other suitable sidelink network. For example, two or more UEs (e.g., UEs 238, 240, and 242) may communicate with each other using sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication.

In order for transmissions over the air interface to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

Data coding may be implemented in multiple manners. In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

Aspects of the present disclosure may be implemented utilizing any suitable channel code. Various implementations of base stations and UEs may include suitable hardware and capabilities (e.g., an encoder, a decoder, and/or a CODEC) to utilize one or more of these channel codes for wireless communication.

In the RAN 200, the ability for a UE to communicate while moving, independent of its location, is referred to as mobility. The various physical channels between the UE and the RAN are generally set up, maintained, and released under the control of an access and mobility management function (AMF, not illustrated, part of the core network 102 in FIG. 1). In some scenarios, the AMF may include a security context management function (SCMF) and a security anchor function (SEAF) that performs authentication. The SCMF can manage, in whole or in part, the security context for both the control plane and the user plane functionality.

In some examples, the RAN 200 may enable mobility and handovers (i.e., the transfer of a UE's connection from one radio channel to another). For example, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

Devices communicating in the radio access network 200 may utilize one or more multiplexing techniques and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Devices in the radio access network 200 may also utilize one or more duplexing algorithms Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, in some scenarios, a channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 3:
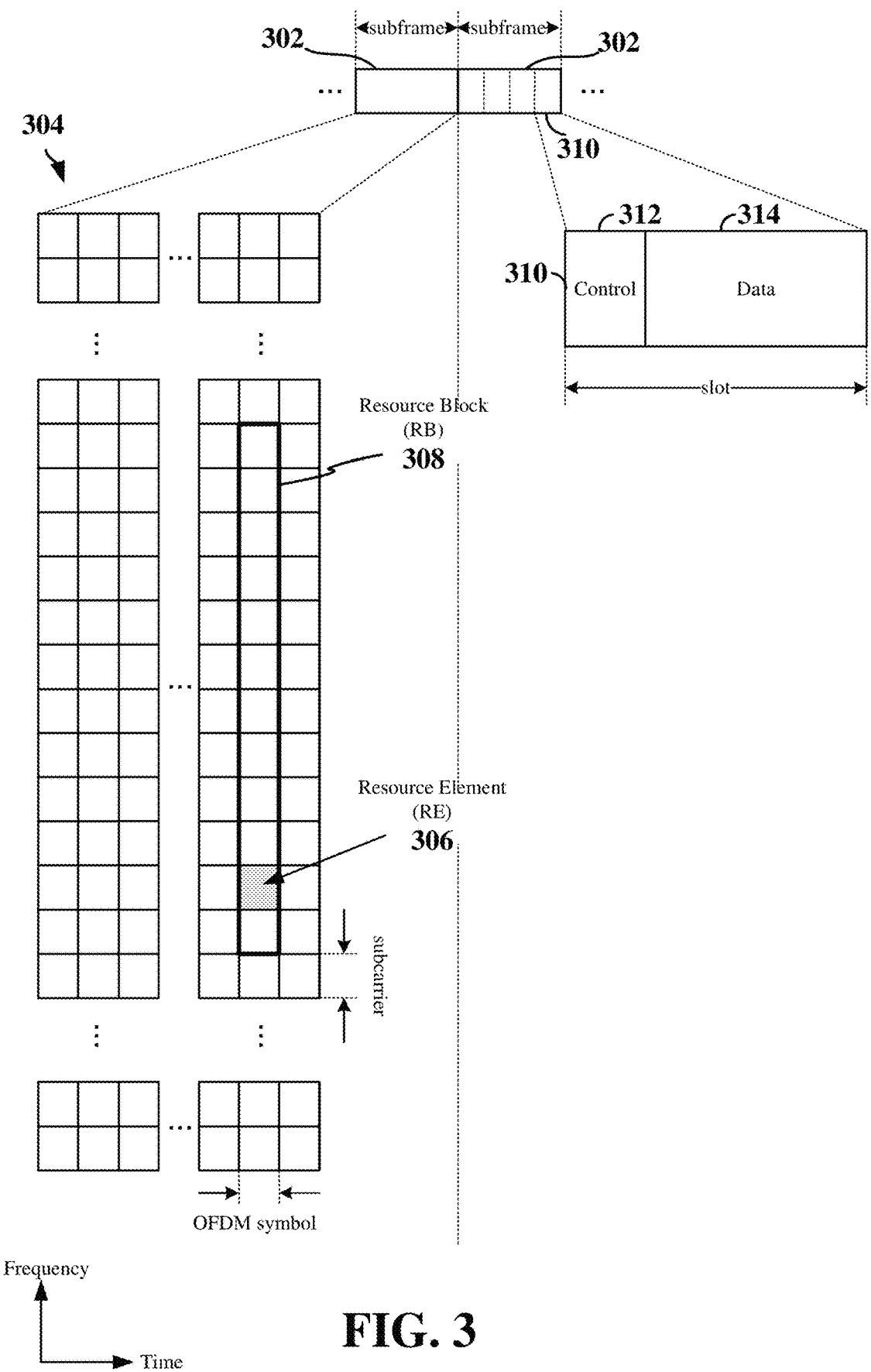
FIG. 3 is a diagram illustrating an example of a frame structure for use in a radio access network according to some aspects.

Referring now to FIG. 3, an expanded view of an exemplary subframe 302 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers of the carrier.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a scheduling entity, such as a base station (e.g., gNB, eNB, etc.), or may be self-scheduled by a UE implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Various deployments can utilize a variety of subframe and/or slot configurations. In some instances, a subframe may have a fixed size or time duration. In some examples, each subframe may be a 1 ms subframe 302. The subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely exemplary in nature, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 30, 80, or 130 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORE-SET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information. A base station may transmit other system information (OSI) as well.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs.

In an example of sidelink communication over a sidelink carrier via a proximity service (ProSe) PC5 interface, the control region 312 of the slot 310 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 310.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 3 are not necessarily all of the channels or carriers that may be utilized between devices, and those of ordinary skill in the art will recognize that other channels or carriers may be utilized in addition to those illustrated, such as other traffic, control, and feedback channels.

Figure 4:
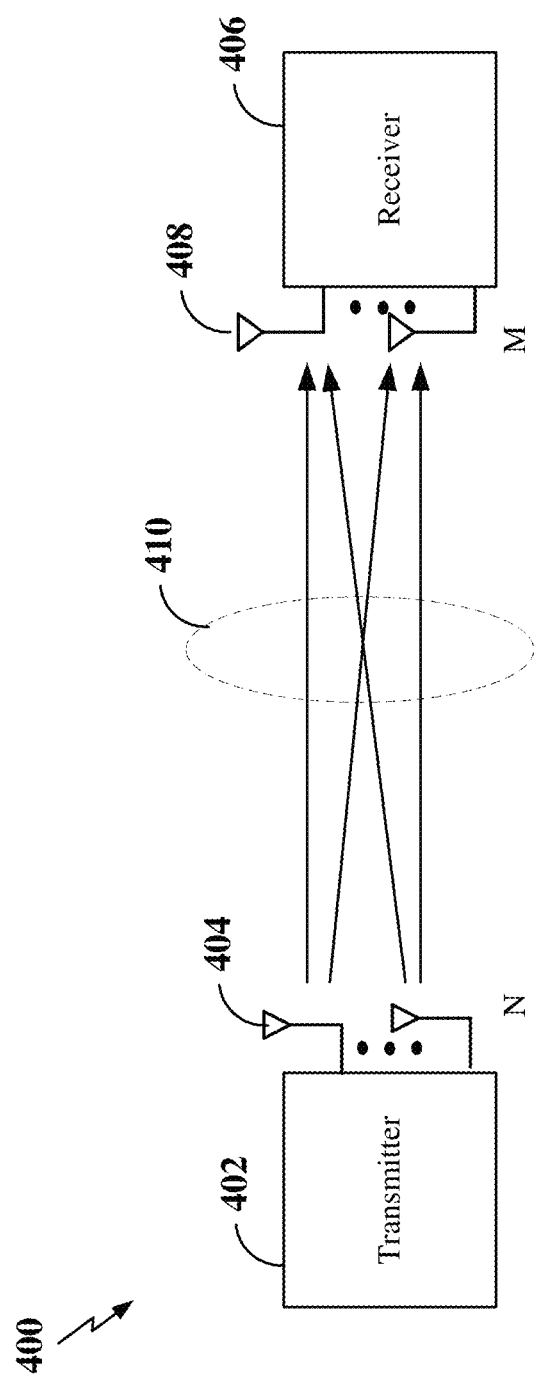
FIG. 4 is a block diagram illustrating a wireless communication system supporting beamforming and/or multiple-input multiple-output (MIMO) communication according to some aspects.

In some aspects of the disclosure, the scheduling entity and/or scheduled entity may be configured for beamforming and/or multiple-input multiple-output (MIMO) technology. FIG. 4 illustrates an example of a wireless communication system 400 supporting beamforming and/or MIMO. In a MIMO system, a transmitter 402 includes multiple transmit antennas 404 (e.g., N transmit antennas) and a receiver 406 includes multiple receive antennas 408 (e.g., M receive antennas). Thus, there are N×M signal paths 410 from the transmit antennas 404 to the receive antennas 408. Each of the transmitter 402 and the receiver 406 may be implemented, for example, within a scheduling entity, a scheduled entity, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system 400 is limited by the number of transmit or receive antennas 404 or 408, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In one example, as shown in FIG. 4, a rank-2 spatial multiplexing transmission on a 2×2 MIMO antenna configuration will transmit one data stream from each transmit antenna 404. Each data stream reaches each receive antenna 408 along a different signal path 410. The receiver 406 may then reconstruct the data streams using the received signals from each receive antenna 408.

Beamforming is a signal processing technique that may be used at the transmitter 402 or receiver 406 to shape or steer an antenna beam (e.g., a transmit beam or receive beam) along a spatial path between the transmitter 402 and the receiver 406. Beamforming may be achieved by combining the signals communicated via antennas 404 or 408 (e.g., antenna elements of an antenna array module) such that some of the signals experience constructive interference while others experience destructive interference. To create the desired constructive/destructive interference, the transmitter 402 or receiver 406 may apply amplitude and/or phase offsets to signals transmitted or received from each of the antennas 404 or 408 associated with the transmitter 402 or receiver 406.

A base station (e.g., gNB) may generally be capable of communicating with UEs using beams of varying beam widths. For example, a base station may be configured to utilize a wider beam when communicating with a UE that is in motion and a narrower beam when communicating with a UE that is stationary. In some examples, to select a particular beam for communication with a UE, the base station may transmit a reference signal, such as a SSB or CSI-RS, on each of a plurality of beams in a beam-sweeping manner. In some examples, SSBs may be transmitted on the wider beams, whereas CSI-RSs may be transmitted on the narrower beams. The UE may measure the reference signal received power (RSRP) or signal-to-interference-plus-noise ratio (SINR) on each of the beams and transmit a beam measurement report (e.g., a Layer 1 (L1) measurement report) to the base station indicating the RSRP or SINR of one or more of the measured beams. The base station may then select the particular beam for communication with the UE based on the L1 measurement report. In other examples, when the channel is reciprocal, the base station may derive the particular beam to communicate with the UE based on uplink measurements of one or more uplink reference signals, such as a sounding reference signal (SRS).

In 5G New Radio (NR) systems, particularly for above 6 GHz or mmWave systems, beamformed signals may be utilized for most downlink channels, including the physical downlink control channel (PDCCH) and physical downlink shared channel (PDSCH). In addition, broadcast control information, such as the SSB, slot format indicator (SFI), and paging information, may be transmitted in a beam-sweeping manner to enable all scheduled entities (UEs) in the coverage area of a transmission and reception point (TRP) (e.g., a gNB) to receive the broadcast control information. In addition, for UEs configured with beamforming antenna arrays, beamformed signals may also be utilized for uplink channels, including the physical uplink control channel (PUCCH) and physical uplink shared channel (PUSCH). However, it should be understood that beamformed signals may also be utilized by enhanced mobile broadband (eMBB) gNBs for sub-6 GHz systems.

Figure 5:
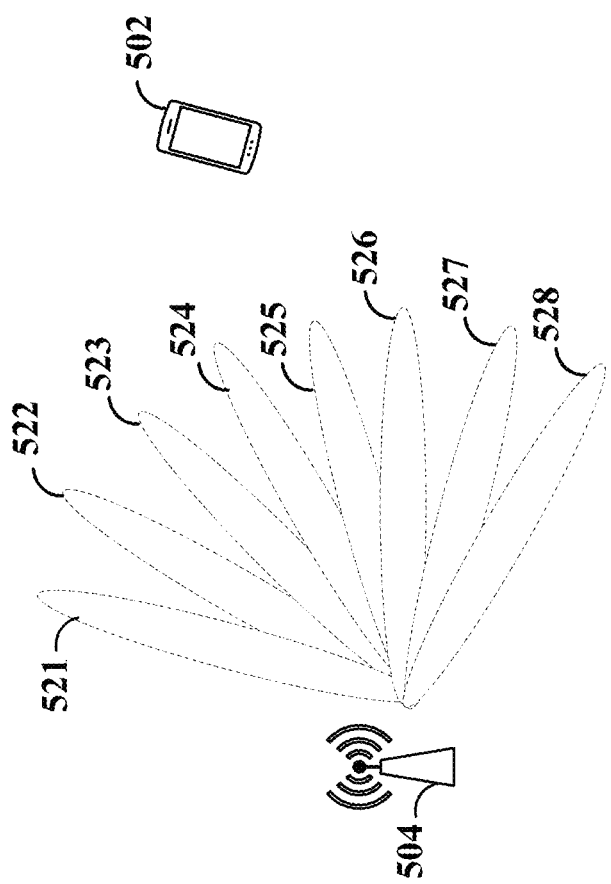
FIG. 5 is a diagram illustrating an example of communication between a radio access network (RAN) node and a wireless communication device using beamforming according to some aspects.

FIG. 5 is a diagram illustrating communication between a radio access network (RAN) node 504 and a wireless communication device 502 using downlink beamformed signals according to some aspects of the disclosure. The RAN node 504 may be any of the base stations or scheduling entities illustrated in FIGS. 1 and 2, and the wireless communication device 502 may be any of the UEs or scheduled entities illustrated in FIGS. 1 and 2. It should be noted that while some beams are illustrated as adjacent to one another, such an arrangement may be different in different aspects. In some examples, beams transmitted during a same symbol may not be adjacent to one another. In some examples, the RAN node 504 may transmit more or less beams distributed in all directions (e.g., 360 degrees).

In the example shown in FIG. 5, a beam set contains eight different beams 521, 522, 523, 524, 525, 526, 527, 528, each associated with a different beam direction. In some examples, the RAN node 504 may be configured to sweep or transmit each of the beams 521, 522, 523, 524, 525, 526, 527, 528 during a synchronization slot. For example, the RAN node 504 may transmit a reference signal, such as a SSB or CSI-RS, on each beam in the different beam directions during the synchronization slot. Transmission of the beam reference signals may occur periodically (e.g., as configured via radio resource control (RRC) signaling by the gNB), semi-persistently (e.g., as configured via RRC signaling and activated/deactivated via medium access control—control element (MAC-CE) signaling by the gNB), or aperiodically (e.g., as triggered by the gNB via downlink control information (DCI)).

The wireless communication device 502 searches for and identifies the beams based on the beam reference signals. The wireless communication device 502 then performs beam measurements (e.g., RSRP, SINR, RSRQ, etc.) on the beam reference signals to determine the respective beam quality of each of the beams. In examples in which the wireless communication device 502 is in a RRC connected state, the wireless communication device 502 may generate and transmit an L1 measurement report, including the respective beam identifier (beam index) and beam measurement of one or more of the beams 521-528 to the RAN node 504. The RAN node 504 may then determine the downlink beam (e.g., beam 524) on which to transmit unicast downlink control information and/or user data traffic to the wireless communication device 502. In some examples, the selected downlink beam has the highest gain from the L1 measurement report. Transmission of the L1 measurement report may occur periodically (e.g., as configured via RRC signaling by the gNB), semi-persistently (e.g., as configured via RRC signaling and activated/deactivated via MAC-CE signaling by the gNB), or aperiodically (e.g., as triggered by the gNB via DCI).

In other examples, when the channel is reciprocal (e.g., the downlink and uplink channel qualities are the same), the RAN node 504 may derive a downlink beam. Derivation of the downlink beam can be based on uplink measurements performed by the RAN node 504, such as by measuring the received power, quality, or other variable of a sounding reference signal (SRS) or other uplink reference signal transmitted by the wireless communication device 502. In some examples, the RAN node 504 may derive the downlink beam based on a combination of the L1 measurement report and uplink measurements.

In examples in which the wireless communication device 502 is a RRC idle state, the wireless communication device 502 may use the beam measurements to select a downlink beam on which to receive broadcast communications from the RAN node 504. The broadcast communications may include, for example, paging messages transmitted from the RAN node 504 to the wireless communication device 502 when new data arrives for the wireless communication device 502 at the network. In some examples, a paging message may be broadcast by the RAN node 504 over multiple downlink beams. The paging message may then be received by the wireless communication device 502 on the selected downlink beam.

In addition to L1 measurement reports, the wireless communication device 502 can further utilize the beam reference signals to estimate the channel quality of the channel between the RAN node 504 and the wireless communication device 502. For example, the wireless communication device may measure the SINR of each received CSI-RS and generate a CSI report based on the measured SINR. The CSI report may include, for example, a channel quality indicator (CQI), rank indicator (RI), precoding matrix indicator (PMI), and/or layer indicator (LI). The scheduling entity may use the CSI report to select a rank for the scheduled entity, along with a precoding matrix and a MCS to use for future downlink transmissions to the scheduled entity. The MCS may be selected from one or more MCS tables, each associated with a particular type of coding (e.g., polar coding, LDPC, etc.) or modulation (e.g., binary phase shift keying (BPSK), quadrature phase shift keying (QPSK), 16 quadrature amplitude modulation (QAM), 64 QAM, 256 QAM, etc.). The LI may be utilized to indicate which column of the precoding matrix of the reported PMI corresponds to the strongest layer codeword corresponding to the largest reported wideband CQI.

The RAN node 504 and wireless communication device 502 may support different types of CSI reports (including L1 measurement reports) and/or different types of measurements. For example, self-contained CSI (e.g., CSI is transmitted back to the RAN node 504 in the same slot as the CSI-RS is transmitted from the RAN node) or non-self-contained CSI (e.g., CSI is transmitted back to the RAN node 504 in a later slot than the slot in which the CSI-RS is transmitted from the RAN node) may be supported. To distinguish between the different report/measurement types and measurement configurations, CSI-RS pilots may be mapped to specific resource elements (REs) and ports for each of the report/measurement types and report/measurement configurations.

Figure 6:
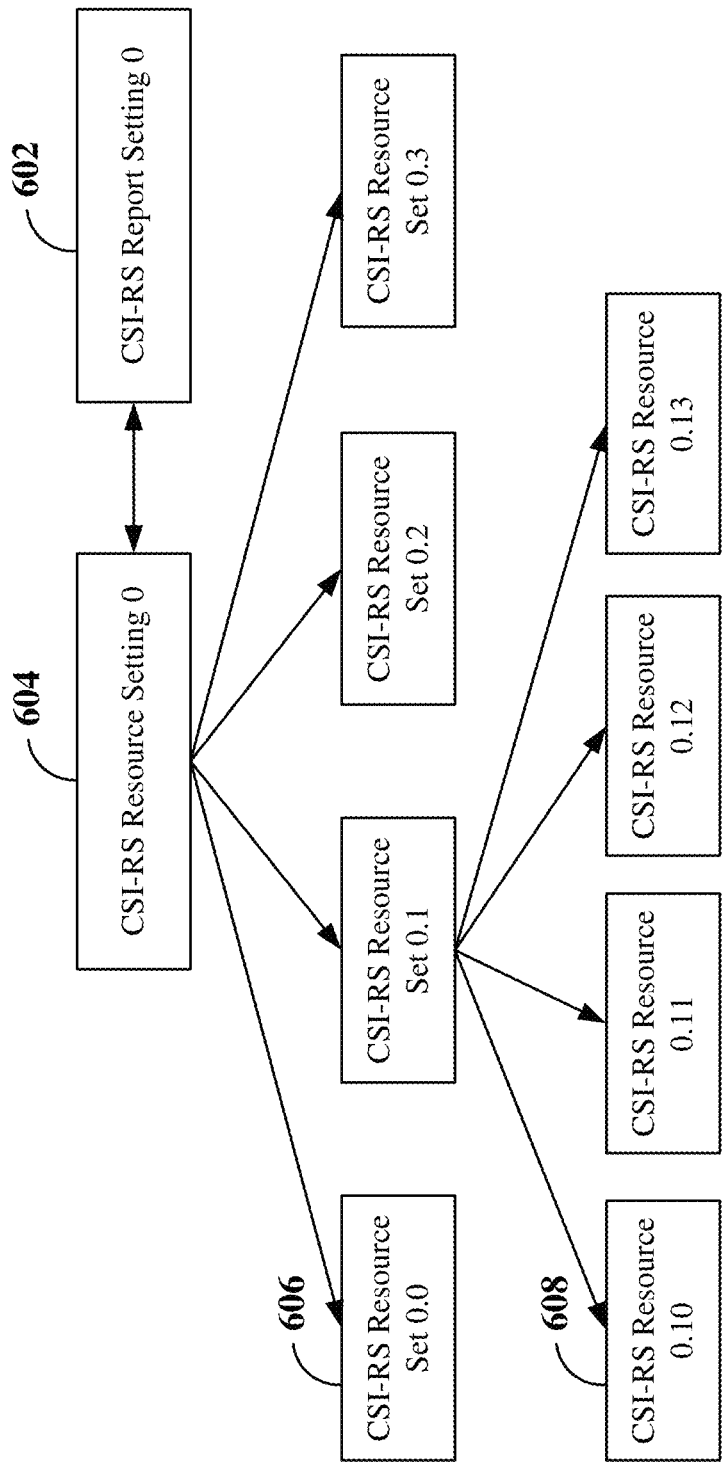
FIG. 6 is a diagram illustrating an example of channel state information (CSI) resource mapping according to some aspects.

FIG. 6 illustrates an exemplary CSI resource mapping to support different report/measurement configurations. The CSI resource mapping includes CSI report setting 602, CSI resource settings 604, CSI resource sets 606, and CSI resources 608. Each CSI resource setting 604 includes one or more CSI resource sets 606, and each CSI resource set 606 includes one or more CSI resources 608. In the example shown in FIG. 6, a single CSI resource setting (e.g., CSI resource setting 0) is illustrated. However, it should be understood that any suitable number of CSI resource settings 604 may be supported.

Each CSI report setting 602 may include a reportQuantity that indicates, for example, the specific CSI parameters and granularity thereof (e.g., wideband/sub-band CQI, PMI, RI, LI, etc.), or L1 parameters (e.g., L1-RSRP, L1-SINR) to include in a CSI report. The CSI report setting 602 may further indicate a periodicity of the CSI report. For example, the CSI report setting 602 may indicate that the report should be generated periodically, aperiodically, or semi-persistently. For aperiodic CSI report settings, the CSI report may be sent on the PUSCH. For periodic CSI report settings, the CSI report may be sent on the PUCCH. For semi-persistent CSI report settings, the CSI report may be sent on the PUCCH or the PUSCH. For example, semi-persistent CSI reports sent on the PUCCH may be activated or deactivated using a medium access control (MAC) control element (MAC-CE). Semi-persistent CSI reports sent on the PUSCH may be triggered using downlink control information (DCI) scrambled with a semi-persistent CSI (SP-CP) radio network temporary identifier (SP-CP-RNTI). CSI report settings 602 may further include a respective priority and other suitable parameters.

Each CSI report setting 602 may be linked to a CSI resource setting 604. Each CSI resource setting 604 may be associated with a particular time domain behavior of reference signals. For example, each CSI resource setting 604 may include periodic, semi-persistent, or aperiodic CSI resources 608. For periodic and semi-persistent CSI resource settings 604, the number of configured CSI resource sets 606 may be limited to one. In general, the CSI resource settings 604 that may be linked to a particular CSI report setting 602 may be limited by the time domain behavior of the CSI resource setting 604 and the CSI report setting 602. For example, an aperiodic CSI report setting 602 may be linked to periodic, semi-persistent, or aperiodic CSI resource settings 604. However, a semi-persistent CSI report setting 602 may be linked to only periodic or semi-persistent CSI resource settings 604. In addition, a periodic CSI report setting 602 may be linked to only a periodic CSI resource setting 604.

Each CSI resource set 606 may be associated with a CSI resource type. For example, CSI resource types may include non-zero-power (NZP) CSI-RS resources, SSB resources, or channel state information interference measurement (CSI-IM) resources. Thus, each CSI resource set 606 includes a list of CSI resources 608 of a particular CSI resource type. In addition, each CSI resource set 606 may further be associated with one or more of a set of frequency resources (e.g., a bandwidth and/or OFDM symbol(s) within a slot), a particular set of ports, a power, or other suitable parameters.

Each CSI resource 608 indicates the particular beam (e.g., ports), frequency resource, and OFDM symbol on which the reference signal may be measured by the wireless communication device. For example, each CSI-RS resource 608 may indicate an RE on which a CSI-RS pilot or SSB transmitted from a particular set of ports (e.g., on a particular beam) may be measured. In the example shown in FIG. 6, CSI-RS resource set 0.1 includes four CSI-RS resources (CSI-RS resource 0.10, CSI-RS resource 0.11, CSI-RS resource 0.12, and CSI-RS resource 0.13). Each CSI resource 608 may further be indexed by a respective beam identifier (ID). The beam ID may identify not only the particular beam (e.g., ports), but also the resources on which the reference signal may be measured. For example, the beam ID may include a CSI-RS resource indicator (CRI) or a SSB resource indicator (SSBRI).

A RAN node may configure a wireless communication device with one or more CSI report settings 602 and CSI resource settings 604 via, for example, radio resource control (RRC) signaling. For example, the RAN node may configure the wireless communication device with a list of periodic CSI report settings 602 indicating the associated CSI resource set 606 that the wireless communication device may utilize to generate periodic CSI reports. As another example, the RAN node may configure the wireless communication device with a list of aperiodic CSI report settings in a CSI-AperiodicTriggerStateList. Each trigger state in the CSI-AperiodicTriggerStateList may include a list of aperiodic CSI report settings 602 indicating the associated CSI resource sets 606 for channel (and optionally interference) measurement. As another example, the RAN node may configure the wireless communication device with a list of semi-persistent CSI report settings in a CSI-SemiPersistentOnPUSCH-TriggerStateList. Each trigger state in the CSI-SemiPersistentOnPUSCH-TriggerStateList may include one CSI report setting 602 indicating the associated CSI resource set 606. The RAN node may then trigger one or more of the aperiodic or semi-persistent trigger states using, for example, DCI. As indicated above, a MAC-CE may be used to activate or deactivate a semi-persistent CSI report setting 602 for a CSI report sent on the PUCCH.

For L1-RSRP measurement reports, the wireless communication device may be configured with a CSI resource setting 604 having up to sixteen CSI resource sets 606. Each of the CSI resource sets 606 may include up to sixty-four CSI resources 608 in each set. The total number of different CSI resources 608 over all the CSI resource sets 606 may be no more than 128. For L1-SINR measurement reports, the wireless communication device may be configured with a CSI resource setting 604 that can include up to 64 CSI resources 608 (e.g., up to 64 CSI-RS resource or up to 64 SSB resources). In examples in which the wireless communication device includes two antenna panels, and therefore, is capable of measuring two beams at a time, the wireless communication device may be configured for group-based beam reporting in which the wireless communication device may measure beams from different transmission and reception points (TRPs). In this example, a single L1 measurement report may include measurements from both TRPs (e.g., the best beam (highest RSRP or SINR) from a first TRP and the best beam from a second TRP). Here, the different CSI-RS or SSB beams from each TRP may be received and measured simultaneously.

Figure 7:
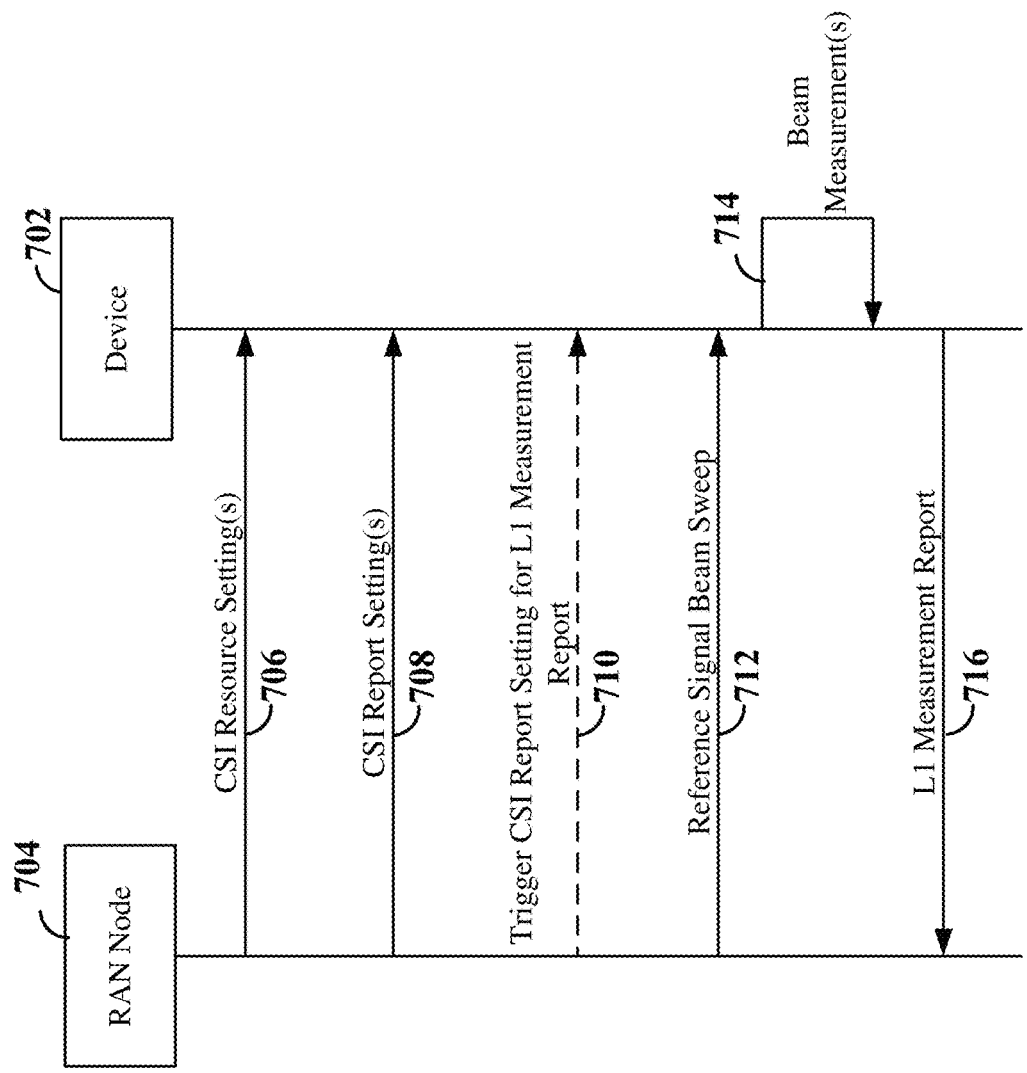
FIG. 7 is a diagram illustrating an example of signaling between a wireless communication device and a RAN node according to some aspects.

FIG. 7 is a diagram illustrating an example of signaling between a wireless communication device (Device) 702 and a RAN node 704 according to some aspects. The wireless communication device 702 may correspond to any of the UEs or scheduled entities shown in FIGS. 1, 2, 4, and/or 5. In addition, the RAN node 704 may correspond to any of the base stations (e.g., gNB, eNB, or TRP) or scheduling entities shown in FIGS. 1, 2, 4, and/or 5.

At 706 and 708, the RAN node 704 can transmit one or more CSI resource setting(s) and one or more CSI report setting(s) to the wireless communication device 702 to configure the wireless communication device with the one or more CSI report setting(s) and associated CSI resource setting(s). In some examples, the CSI report setting(s) and associated CSI resource setting(s) may be transmitted to the wireless communication device via RRC signaling.

In examples in which the CSI report setting(s) include periodic L1 measurement report setting(s), the wireless communication device may utilize the periodic L1 measurement report setting(s) to generate corresponding L1 measurement reports. In examples in which the CSI report setting(s) include aperiodic or semi-persistent L1 measurement report setting(s), at 710, the RAN node 704 may trigger an aperiodic or semi-persistent L1 measurement report setting via, for example, DCI or a MAC-CE.

At 712, the RAN node 704 can perform a beam sweep to transmit a reference signal (e.g., a SSB or CSI-RS) on each of a plurality of beams to the wireless communication device 702. At 714, the wireless communication device 702 identifies and measures the RSRP or SINR of a respective beam reference signal on one or more configured beams (e.g., based on the CSI resources in the CSI resource set(s) associated with the CSI report setting).

Measurement reports and procedures may have a variety of features and deployment options. For example, measurement reports may be communicated at various stack layers.

At 716, for example, the wireless communication device 702 can transmit an L1 measurement report (e.g., L1-RSRP or L1-SINR for SSB or CSI-RS). The measurement report can be transmitted to the RAN node 704. Configuration of the measurement report can be done in accordance with or based on one or more CSI report setting(s). For a particular CSI report setting, up to four L1 measurements (e.g., up to four different beams) may be included in the L1 measurement report. The largest measured value may be quantized to seven bits. For L-RSRP or L1-SINR measurement reports or if group-based beam reporting is enabled, each of the other included measurements (up to three measurements) in the L1 measurement report may be differential measurements (with respect to the largest measured value) that are quantized to four-bit values. The beam measurements for multiple CSI report settings may be sent in a single PUCCH/PUSCH payload (e.g., a single L1 measurement report). Additionally or alternatively, multiple payloads may be used. The number of CSI report settings may be limited though by the PUCCH/PUSCH payload size. For example, if the payload size is not sufficient to carry all of the CSI report settings, CSI report settings with the lowest priority may be dropped.

CSI reports may also consider static, semi-static, and/or dynamic channel conditions. For stationary reduced capability devices, such as industrial sensors and video surveillance cameras, the channel conditions may not vary frequently. Therefore, the beam(s) and the order of the beams in the L1 measurement report(s) may not change often. Various aspects of the disclosure relate to reducing the payload size for L1 measurement reports. A reduction in L1 measurement report payload size can improve reporting coverage by maximizing the number of CSI report settings that may be sent in a PUCCH/PUSCH payload. In addition, reducing the L1 measurement report payload size can enable a reduction in the amount of repeated information (e.g., CRI/SSBRI) included in each L1 measurement report.

Figure 8:
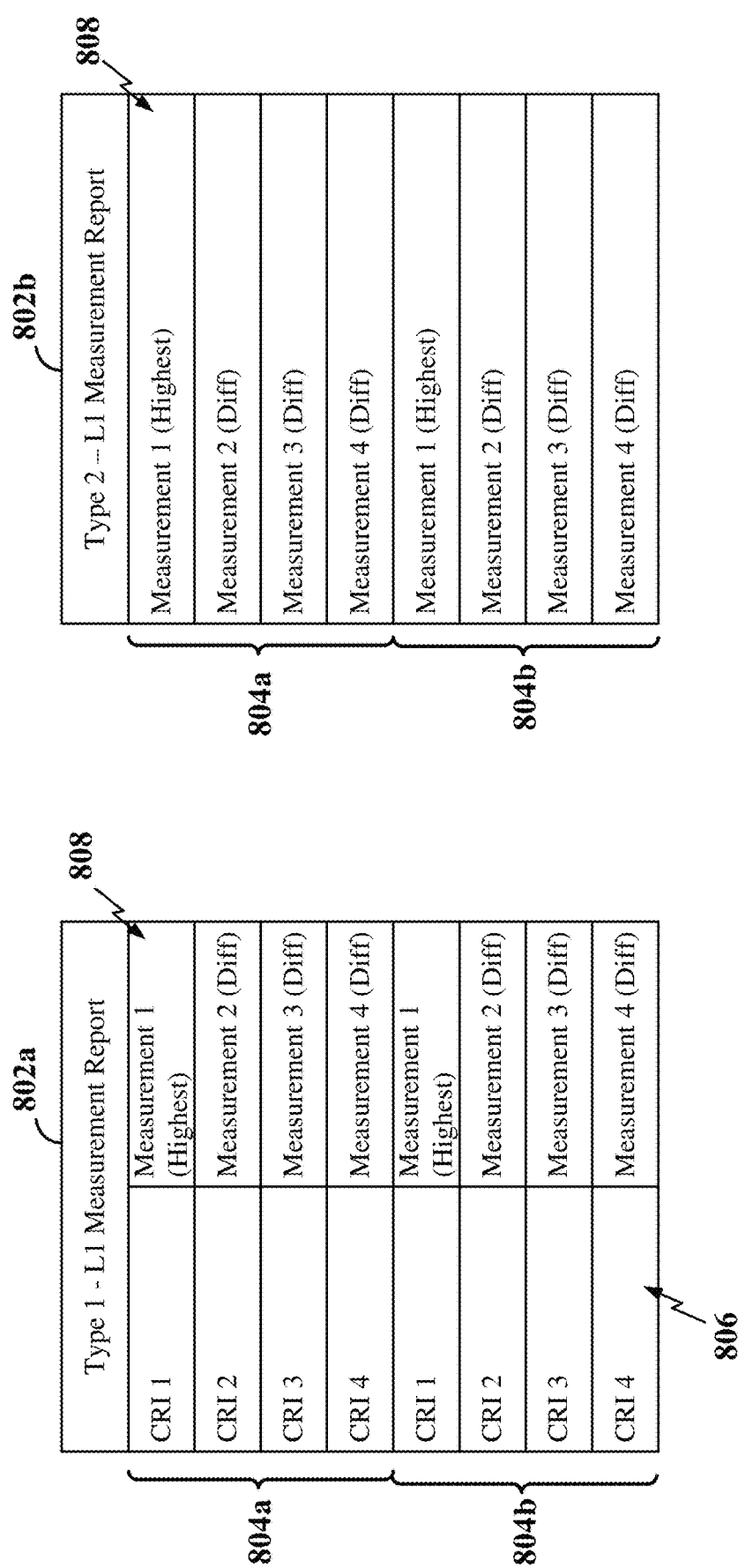
FIG. 8 is a diagram illustrating examples of various configurations of L1 measurement reports according to some aspects.

FIG. 8 is a diagram illustrating examples of various configurations of L1 measurement reports according to some aspects. In the example shown in FIG. 8, two L1 measurement report configurations 802a and 802b are illustrated. Each L1 measurement report configuration 802a and 802b is associated with a different information type. Each information type indicates a different set of information to include in the L1 measurement reports 802a and 802b. For example, a first L1 measurement report configuration 802a is associated with Type 1 information and a second L1 measurement report configuration 802b is associated with Type 2 information.

The Type 1—L1 measurement report 802a can include up to four beam measurements (e.g., RSRP or SINR values) 808 and a respective beam ID 806 (e.g., CRI or SSBRI) associated with each of the beam measurements for each CSI report setting 804. In the example shown in FIG. 8, two CSI report settings 804a and 804b are included in each L1 measurement report 802a and 802b. The Type 2—L1 measurement report 802b includes a reduced payload containing only the beam measurements 808 for each CSI report setting 804a and 804b. The beam measurements 808 for each CSI report setting 804a and 804b may include an exact value for a highest (largest) beam measurement and a respective differential (diff) value with respect to the exact highest value for each remaining beam measurement. The exact highest measured value may be quantized to seven bits. The differential measurement values (with respect to the highest measured value) may be quantized to four bits.

In some examples, each CSI report setting 804a and 804b is associated with a particular selected information type. The information type for each CSI report setting 804a and 804b may be selected by the wireless communication device or signaled by the RAN node. In some examples, the information type may be applied per L1 measurement report, as shown in FIG. 8. In this example, the selected information type is the same for each CSI report setting 804a and 804b included in a particular L1 measurement report 802a or 802b. In other examples, the information type may be applied per CSI report setting. In this example, the selected information type may differ between CSI report settings included in a particular L1 measurement report.

Figure 9:
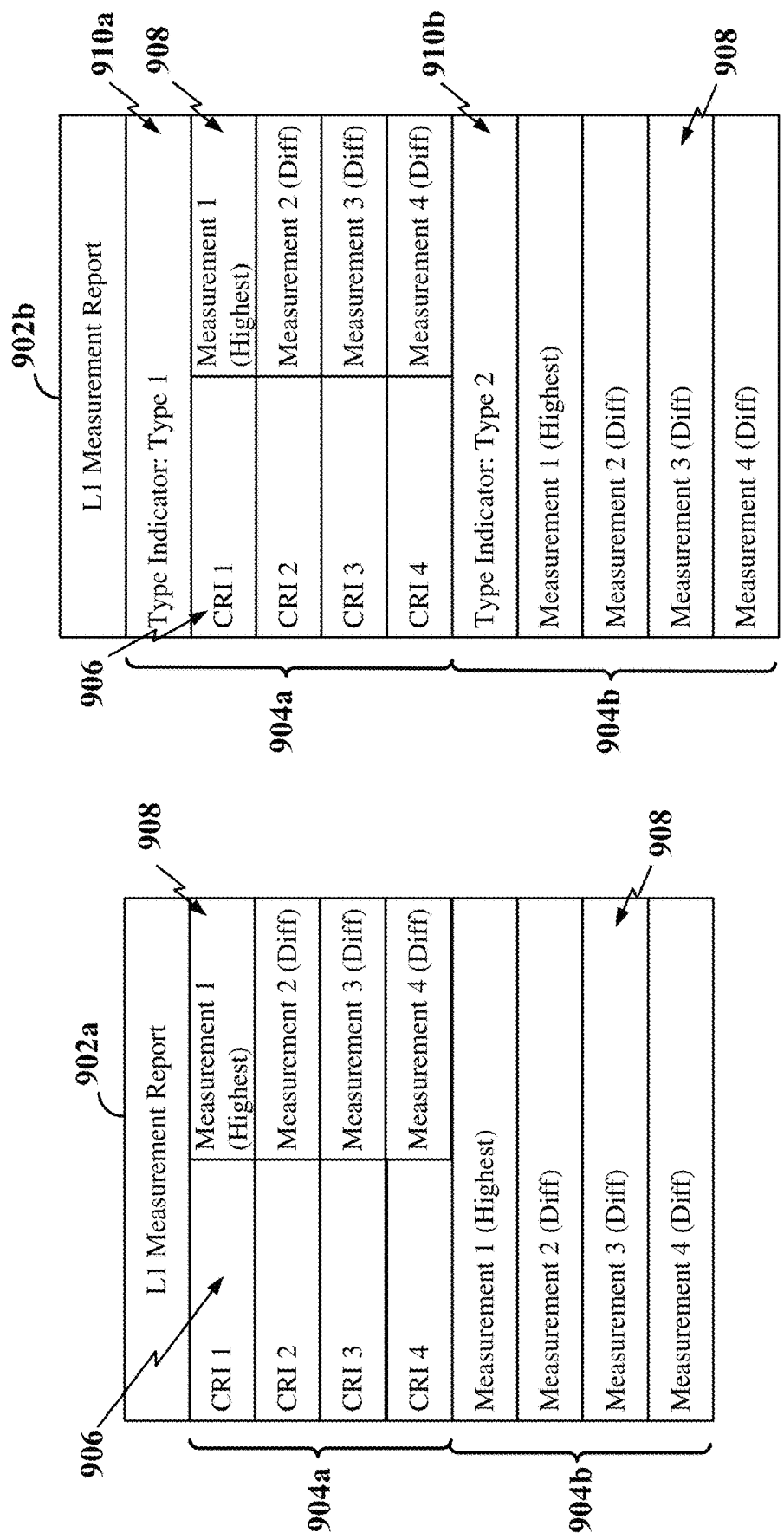
FIG. 9 is a diagram illustrating examples of L1 measurement reports including multiple information types according to some aspects.

FIG. 9 is a diagram illustrating examples of L1 measurement reports including multiple information types according to some aspects. In the example shown in FIG. 9, two L1 measurement reports 902a and 902b are illustrated. Each L1 measurement report 902a and 902b includes beam measurements 908 associated with two different CSI report settings 904a and 904b. The selected information type for a first CSI report setting 904a is Type 1 and the selected information type for a second CSI report setting 904b is Type 2. Thus, for the first CSI report setting 904a, each L1 measurement report 902a and 902b includes up to four beam measurements (e.g., RSRP or SINR values) 908 and a respective beam ID 906 (e.g., CRI or SSBRI) associated with each of the beam measurements. For the second CSI report setting 904b, each L1 measurement report 902a and 902b includes only the beam measurements 908.

In some examples, the RAN node may be configured to blind detect the information type(s) included in an L1 measurement report 902a. For example, the RAN node may blind detect the information type based on the payload size or payload configuration of the PUCCH/PUSCH carrying the L1 measurement report. In other examples, the wireless communication device can explicitly indicate the information type(s) in the L1 measurement report. For example, the L1 measurement report 902b includes type indicators 910a and 910b, each indicating a respective information type associated with the corresponding CSI report setting 904a and 904b. For example, type indicator 910a indicates that the first CSI report setting 904a is associated with Type 1. Similarly, type indicator 910b indicates that the second CSI report setting 904b is associated with Type 2. In some examples, the type indicators 910a and 910b may be per CSI report setting 904a and 904b, as shown in FIG. 9. In other examples, the type indicator may be per L1 measurement report (e.g., as in the examples shown in FIG. 8).

Figure 10:
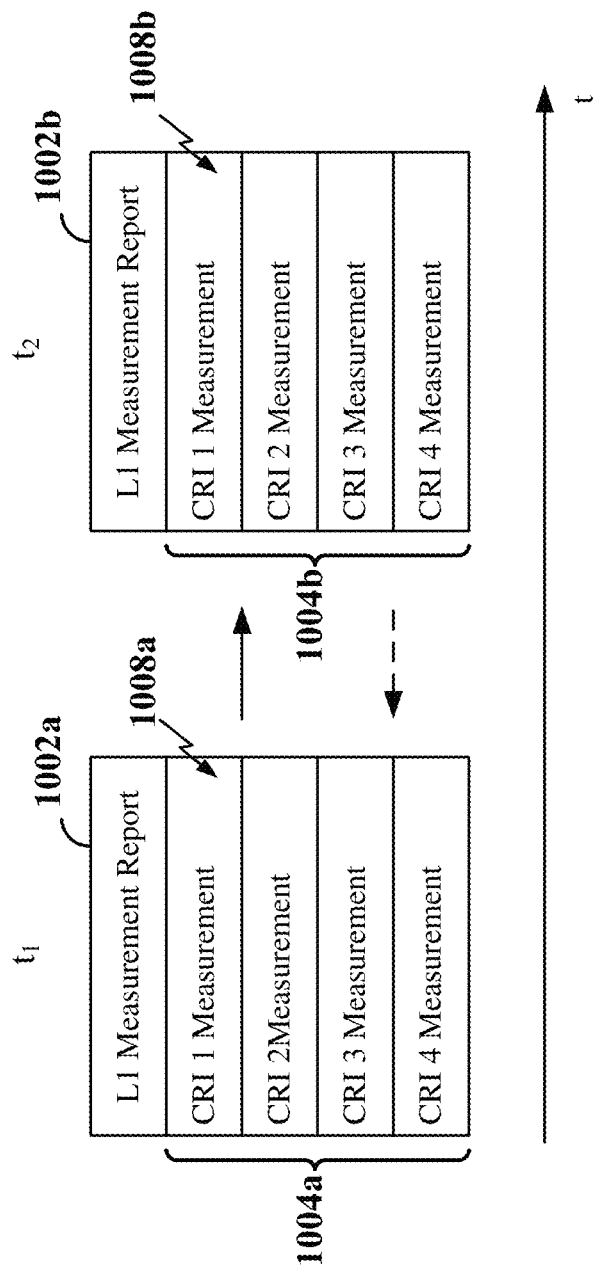
FIG. 10 is a diagram illustrating an example of L1 measurement reports sent over time according to some aspects.

FIG. 10 is a diagram illustrating an example of L1 measurement reports sent over time according to some aspects. In the example shown in FIG. 10, two L1 measurement reports 1002a and 1002b are illustrated. A first L1 measurement report 1002a may be sent at a first time ($t_1$) and a second L1 measurement report 1002b may be sent at a second time ($t_2$). Thus, the first L1 measurement report 1002a may be considered a previous L1 measurement report in comparison to the second L1 measurement report 1002b.

Each L1 measurement report 1002a and 1002b can be a periodic L1 measurement report or a semi-persistent L1 measurement report. In addition, each L1 measurement report 1002a and 1002b may include respective beam measurements 1008a and 1008b associated with a respective CSI report setting 1004a and 1004b. In some examples, the CSI report settings 1004a and 1004b can be the same or different. It should be understood that multiple CSI report settings may be included in each L1 measurement report 1002a and 1002b.

In some examples, the beam measurements 1008a in the first L1 measurement report 1002a may be arranged in an order that may be configured based on the beam measurement values. For example, the first beam measurement in the first L1 measurement report 1002a may have the highest value, the second beam measurement in the first L1 measurement report 1002a may have the second highest value, and so on.

In an aspect, when the CSI report setting 1004b of the second L1 information report 1002b includes the same set of beam IDs as the CSI report setting 1004a of the previous L1 measurement report 1002a, the wireless communication device may be configured to select Type 2 for the CSI report setting 1004b associated with the second L1 measurement report 1002b. The wireless communication device can further be configured to send the beam measurements 1008b in the second L1 measurement report 1002b in the same order of beam IDs as the previous L1 measurement report 1002a. For example, the first L1 measurement report 1002a includes beam measurements 1008a for CRI 1, CRI 2, CRI 3, and CRI 4 in that order. Therefore, the second L1 measurement report 1002b can also include beam measurements for CRI 1, CRI 2, CRI 3, and CRI 4 in that order, regardless of the beam measurement values.

In another aspect, when the second L1 measurement report 1002b includes the same set of beam IDs as the previous L1 measurement report 1002a, the wireless communication device may be configured to select Type 2 for the CSI report setting 1004b associated with the second L1 measurement report 1002b. The wireless communication device can further be configured to send the beam measurements 1008b in the second L1 measurement report 1002b in the same order of beam IDs as the previous L1 measurement report 1002a. In the example shown in FIG. 10, the information type for the previous L1 measurement report 1002a is configured as Type 2. However, the wireless communication device may configure the information type of the second L1 measurement report 1002b to be Type 2 regardless of whether the information type of the previous L1 measurement report 1002a is Type 1 or Type 2.

Otherwise, when the previous L1 measurement report 1002a or CSI reporting setting 1004a associated with the previous L1 measurement report 1002a includes a different set of beam IDs, the wireless communication device may be configured to select Type 1 for the second L1 measurement report 1002b and send the beam measurements 1008b in an order based on the beam measurement values.

Figure 11:
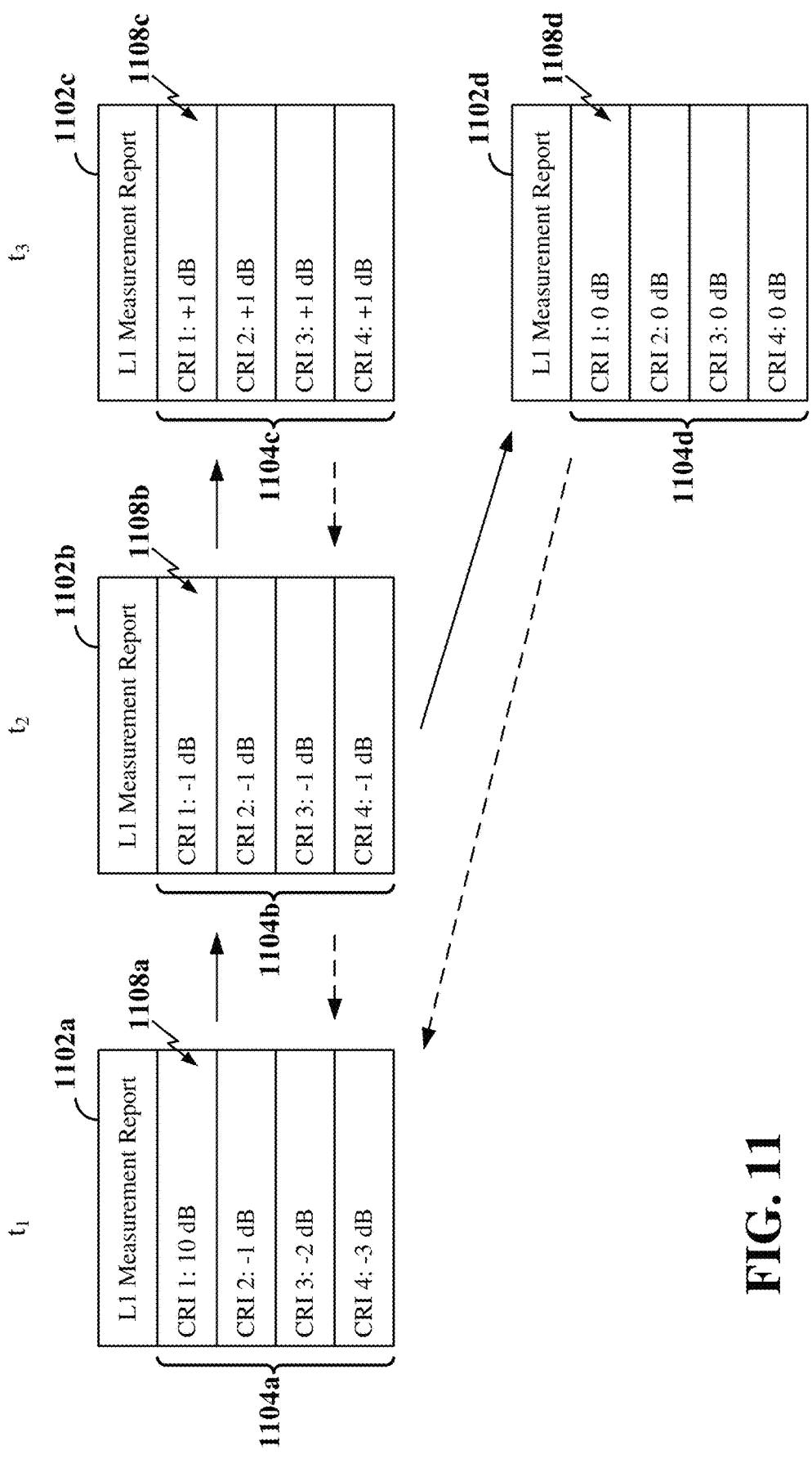
FIG. 11 is a diagram illustrating another example of L1 measurement reports sent over time according to some aspects.

FIG. 11 is a diagram illustrating another example of L1 measurement reports sent over time according to some aspects. In the example shown in FIG. 11, four L1 measurement reports 1102a-1102d are illustrated. Each of the L1 measurement reports 1102a-1102d can be a periodic L1 measurement report or a semi-persistent L1 measurement report. In addition, each L1 measurement report 1102a and 1102b may include respective beam measurements 1108a-1108d associated with a respective CSI report setting 1104a-1104d. In some examples, the CSI report settings 1104a-1104d can be the same or different. It should be understood that multiple CSI report settings may be included in each L1 measurement report 1102a-1102d.

A first L1 measurement report 1102a may be transmitted at a first time sent at a first time ($t_1$), a second L1 measurement report 1102b may be sent at a second time ($t_2$), and one of a third L1 measurement report 1102c or a fourth L1 measurement report 1102d may be sent at a third time ($t_3$). Therefore, the first L1 measurement report 1102a may be a previous L1 measurement report for the second L1 measurement report 1102b, and the second L1 measurement report 1102b may be a previous L1 measurement report for the third L1 measurement report 1102c. Although the second L1 measurement report 1102b is the last previous L1 measurement report with respect to the fourth L1 measurement report 1102d, as shown in the example of FIG. 11, the first L1 measurement report 1102a may be considered the previous L1 measurement report for the fourth L1 measurement report 1102d.

In the example shown in FIG. 11, each of the CSI report settings 1104a-1104d or each of the L1 measurement reports 1102a-1102d includes the same set of beam IDs (e.g., CRIs or SSBRIs). Therefore, the wireless communication device may be configured to select Type 2 for the CSI report settings 1104b-1104d associated with the L1 measurement reports 1102b-1102d. The wireless communication device can further be configured to send the beam measurements 1108b-1108d in the L1 measurement reports 1102b-1102d in the same order of beam IDs as the previous L1 measurement report.

The beam measurements 1108a in the first L1 measurement report 1102a may be arranged in an order that may be configured based on the beam measurement values. For example, the first beam measurement in the first L1 measurement report 1102a may have the highest value, the second beam measurement in the first L1 measurement report 1102a may have the second highest value, and so on. In addition, the beam measurements 1108a in the first L1 measurement report 1102a may include absolute beam measurements. For example, the beam measurements 1108a may include an exact value for the highest beam measurement and a respective differential value with respect to the exact highest value for each remaining beam measurement. The exact highest measured value may be quantized to seven bits. The differential measured values (with respect to the highest measured value) may be quantized to four bits.

In the example shown in FIG. 11, the highest beam measurement (e.g., corresponding to a first beam ID, CRI 1) in the first L1 measurement report 1102a indicates a value of 10 decibels (dB), the second highest beam measurement (e.g., corresponding to a second beam ID, CRI 2) indicates a differential value of −1 dB with respect to the highest beam measurement, the third highest beam measurement (e.g., corresponding to a third beam ID, CRI 3) indicates a differential value of −2 dB with respect to the highest beam measurement, and the fourth highest beam measurement (e.g., corresponding to a fourth beam ID, CRI 4) indicates a differential value of −3 dB with respect to the highest beam measurement. Thus, the first L1 measurement report 1102a indicates the following order of beam measurement values for CRI 1, CRI 2, CRI 3, and CRI 4: 10 dB, 9 dB, 8 dB, and 7 dB.

In some examples, the beam measurements 1108b in the second L1 measurement report 1102b can include differential beam measurement values with respect to corresponding beam measurements in the first L1 measurement report 1102a. In addition, the beam measurements 1108b in the second L1 measurement report 1102b can be listed in the same order as the first L1 measurement report 1102a. In the example shown in FIG. 11, the beam measurements 1108b indicate a respective differential value of −1 dB with respect to the corresponding beam measurements 1108a in the first L1 measurement report 1102a for each beam ID (CRI 1, CRI 2, CRI 3, and CRI 4). Thus, the second L1 measurement report 1102b indicates the following order of beam measurement values for CRI 1, CRI 2, CRI 3, and CRI 4: 9 dB, 8 dB, 7 dB, and 6 dB.

Similarly, the beam measurements 1108c in the third L1 measurement report 1102c can include differential beam measurement values with respect to corresponding beam measurements in the second L1 measurement report 1102b. In addition, the beam measurements 1108c in the third L1 measurement report 1102c can be listed in the same order as the second L1 measurement report 1102b. In the example shown in FIG. 11, the beam measurements 1108c indicate a respective differential value of +1 dB with respect to the corresponding beam measurements 1108b in the second L1 measurement report 1102b for each beam ID (CRI 1, CRI 2, CRI 3, and CRI 4). Thus, the third L1 measurement report 1102c indicates the following order of beam measurement values for CRI 1, CRI 2, CRI 3, and CRI 4: 10 dB, 9 dB, 8 dB, and 7 dB.

In some examples, instead of including differential values compared to a last previous differential L1 measurement report 1102b as in the third L1 measurement report 1102c, the wireless communication device can generate an L1 measurement report 1102d including differential values compared to a previous absolute L1 measurement report. For example, the beam measurements 1108d in the fourth L1 measurement report 1102d can include differential beam measurement values with respect to corresponding beam measurements 1108a in the first L1 measurement report 1102a. In addition, the beam measurements 1108d in the fourth L1 measurement report 1102d can be listed in the same order as the first L1 measurement report 1102a. In the example shown in FIG. 11, the beam measurements 1108d indicate a respective differential value of 0 dB with respect to the corresponding beam measurements 1108a in the first L1 measurement report 1102a. Thus, the beam measurements 1108d included in the fourth L1 measurement report 1102d indicate the same beam measurements 1108c as in the third beam measurement report 1102c, namely: 10 dB for CRI 1, 9 dB for CRI 2, 8 dB for CRI 3, and 7 dB for CRI 4.

Figure 12:
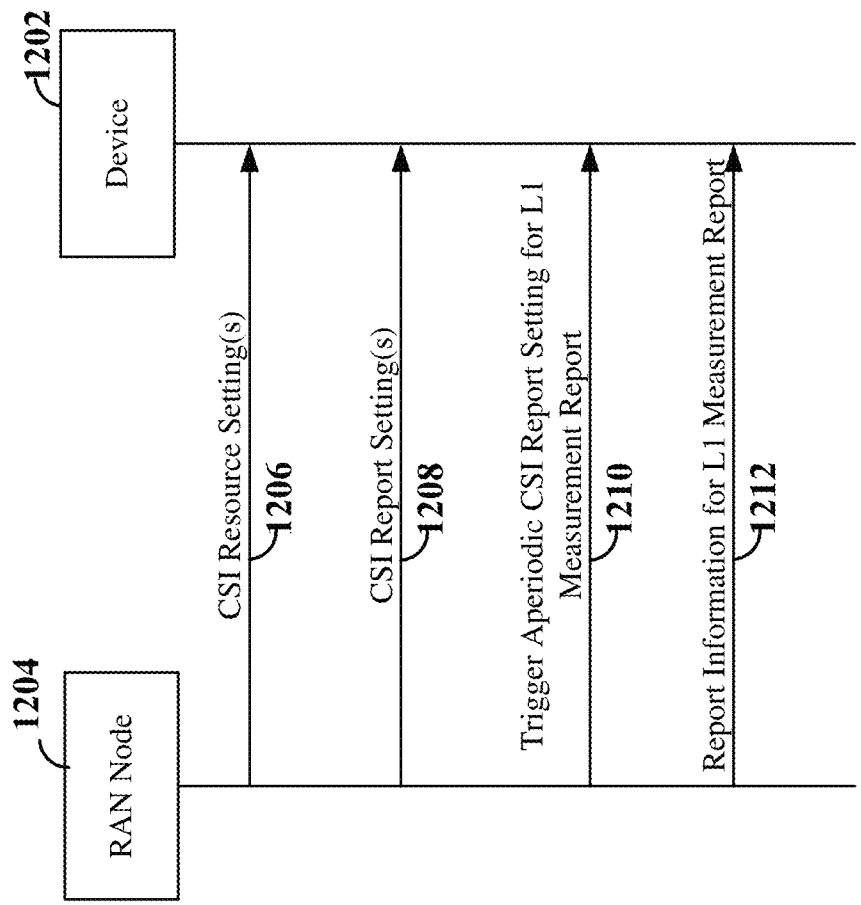
FIG. 12 illustrates another example of signaling between a wireless communication device and a RAN node according to some aspects.

FIG. 12 is a diagram illustrating an example of signaling between a wireless communication device (Device) 1202 and a RAN node 1204 according to some aspects. The wireless communication device 1202 may correspond to any of the UEs or scheduled entities shown in FIGS. 1, 2, 4, and/or 5. In addition, the RAN node 1204 may correspond to any of the base stations (e.g., gNB, eNB, or TRP) or scheduling entities shown in FIGS. 1, 2, 4, and/or 5.

At 1206 and 1208, the RAN node 1204 can transmit one or more CSI resource setting(s) and one or more CSI report setting(s) to the wireless communication device 1202 to configure the wireless communication device with the one or more CSI report setting(s) and associated CSI resource setting(s). In some examples, the CSI report setting(s) and associated CSI resource setting(s) may be transmitted to the wireless communication device via RRC signaling.

In the example shown in FIG. 12, at least one of the CSI report settings includes an aperiodic L1 measurement report setting. For example, the RAN node 1204 may configure the wireless communication device 1202 with a list of aperiodic CSI report settings in a CSI-AperiodicTriggerStateList. Each trigger state in the CSI-AperiodicTriggerStateList may include a list of aperiodic CSI report settings indicating the associated CSI resource sets for channel (and optionally interference) measurement. At 1210, the RAN node 1204 may trigger one or more of the aperiodic trigger states using, for example, DCI.

At 1212, the RAN node 1204 may further transmit report information associated with an aperiodic CSI report setting or an aperiodic L1 measurement report. The report information may be included in the DCI containing the trigger for the aperiodic L1 measurement report or within a different message.

In some examples, the report information can include, for example, a list and order of beam measurements associated with the aperiodic CSI report setting or the aperiodic L1 measurement report. For example, the report information may indicate to include a subset of the beam IDs associated with an aperiodic CSI report setting in an aperiodic L1 measurement report. The report information may further indicate a first arrangement of the beam measurements in the aperiodic L1 measurement report in a designated order of the beam IDs (e.g., the full set included in the CSI report setting or a subset thereof). In other examples, the report information can indicate a second arrangement of the beam measurements in the aperiodic L1 measurement report in a same order of the respective beam IDs as a previous L1 measurement report or a previous CSI report setting. The previous L1 measurement report or previous CSI report setting may be periodic, aperiodic, or semi-persistent.

Figure 13:
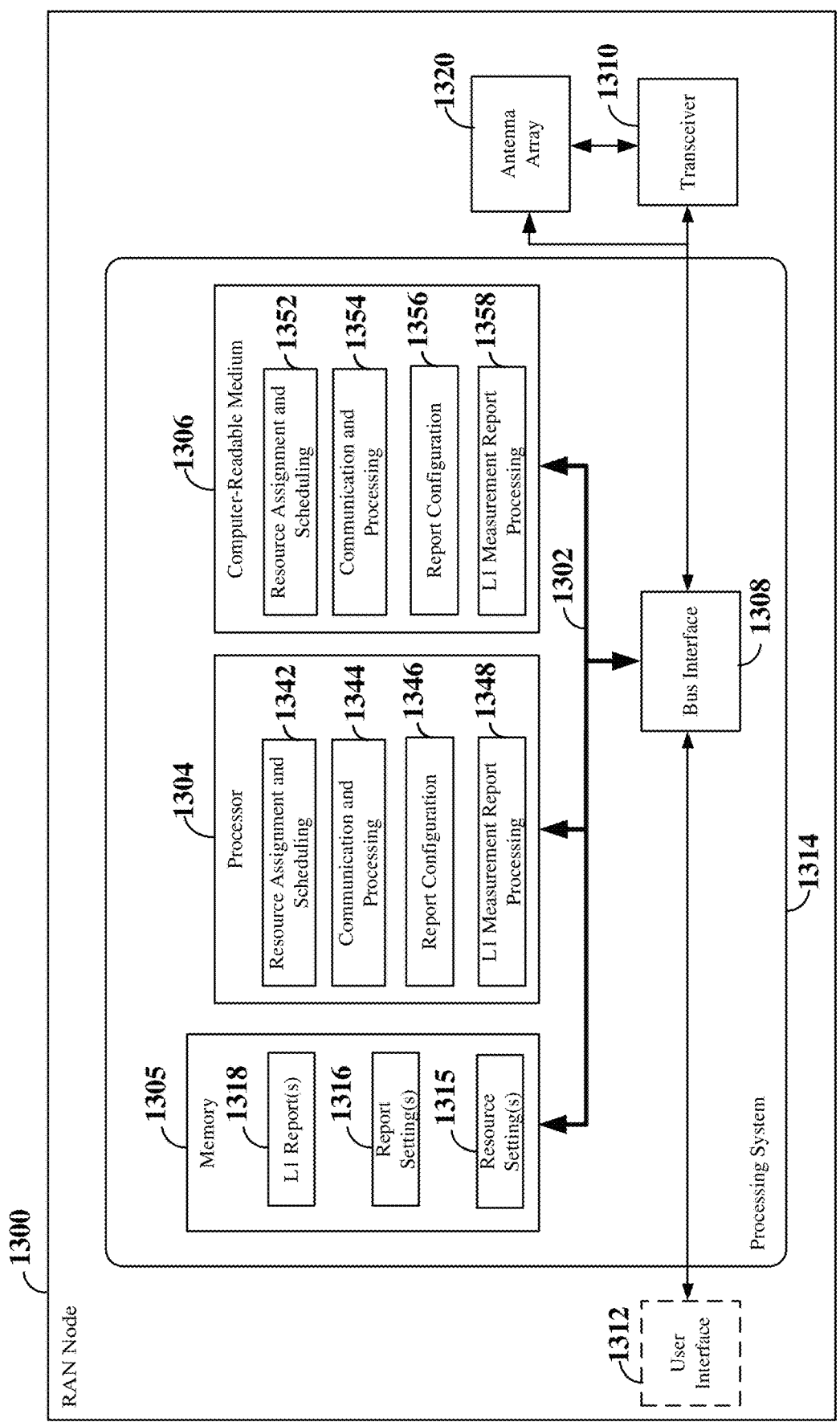
FIG. 13 is a block diagram illustrating an example of a hardware implementation for a RAN node employing a processing system according to some aspects.

FIG. 13 is a conceptual diagram illustrating an example of a hardware implementation for an exemplary RAN node 1300 employing a processing system 1314. For example, the RAN node 1300 may be a base station (e.g., gNB) or other scheduling entity as illustrated in any one or more of FIGS. 1, 2, 4, 5, 7, and/or 12.

The RAN node 1300 may be implemented with a processing system 1314 that includes one or more processors 1304. Examples of processors 1304 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the RAN node 1300 may be configured to perform any one or more of the functions described herein. That is, the processor 1304, as utilized in a RAN node 1300, may be used to implement any one or more of the processes described below. The processor 1304 may in some instances be implemented via a baseband or modem chip and in other implementations, the processor 1304 may itself comprise a number of devices distinct and different from a baseband or modem chip (e.g., in such scenarios is may work in concert to achieve examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1314 may be implemented with a bus architecture, represented generally by the bus 1302. The bus 1302 may include any number of interconnecting buses and bridges depending on the specific application of the processing system 1314 and the overall design constraints. The bus 1302 communicatively couples together various circuits including one or more processors (represented generally by the processor 1304), a memory 1305, and computer-readable media (represented generally by the computer-readable medium 1306). The bus 1302 may also link various other circuits such as timing sources, peripherals, voltage regulators, and power management circuits, which are well known in the art, and therefore, will not be described any further. A bus interface 1308 provides an interface between the bus 1302, a transceiver 1310, and an antenna array 1320. The antenna array 1320 may be a single panel antenna array or a multi-panel antenna array. The transceiver 1310 provides a means for communicating with various other apparatus over a transmission medium (e.g., air interface). A user interface 1312 (e.g., keypad, display, touchscreen, speaker, microphone, control knobs, etc.) may also be provided. Of course, such a user interface 1312 is optional, and may be omitted in some examples.

The processor 1304 is responsible for managing the bus 1302 and general processing, including the execution of software stored on the computer-readable medium 1306. The software, when executed by the processor 1304, causes the processing system 1314 to perform the various functions described below for any particular apparatus. The computer-readable medium 1306 and the memory 1305 may also be used for storing data that is manipulated by the processor 1304 when executing software.

One or more processors 1304 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1306.

The computer-readable medium 1306 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 1306 may reside in the processing system 1314, external to the processing system 1314, or distributed across multiple entities including the processing system 1314. The computer-readable medium 1306 may be embodied in a computer program product. In some examples, the computer-readable medium 1306 may be part of the memory 1305. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 1304 may include circuitry configured for various functions. For example, the processor 1304 may include resource assignment and scheduling circuitry 1342, configured to generate, schedule, and modify a resource assignment or grant of time-frequency resources. For example, the resource assignment and scheduling circuitry 1342 may schedule time-y resources within a plurality of sub-bands or BWPs of one or more subframes or slots to carry user data traffic and/or control information to and/or from multiple wireless communication devices.

In various aspects of the present disclosure, the resource assignment and scheduling circuitry 1342 may be configured to schedule resources for the transmission of one or more RRC messages including one or more resource settings 1315 (e.g., CSI resource settings) and one or more report settings 1316 (e.g., CSI report settings) to one or more wireless communication devices for configuration of respective resource settings and respective report settings on each of the wireless communication devices. The resource settings 1315 and report settings 1316 may be maintained, for example, in memory 1305. The resource assignment and scheduling circuitry 1342 may further be configured to schedule resources for the transmission of an activation or deactivation message (e.g., via a MAC-CE) to a wireless communication device to activate or deactivate a semi-persistent report setting associated with PUCCH reporting. In addition, the resource assignment and scheduling circuitry 1342 may be configured to schedule resources for the transmission of a trigger message (e.g., via DCI) to a wireless communication device to trigger an aperiodic or semi-persistent report setting associated with PUSCH reporting. Furthermore, the resource assignment and scheduling circuitry 1342 may be configured to schedule resources for the transmission of report information associated with an aperiodic report setting (e.g., via the DCI containing the trigger message or a different message) to a wireless communication device to indicate a list and/or order of beam measurements to include in an aperiodic L1 measurement report.

The resource assignment and scheduling circuitry 1342 may further be configured to schedule resources for the periodic, aperiodic, and/or semi-persistent transmission of a plurality of reference signals on a plurality of beams. For example, the reference signals may include SSBs and/or -RSs. The resource assignment and scheduling circuitry 1342 may further be configured to schedule resources for the transmission of one or more uplink L1 measurement reports 1318 on one or more PUCCH or PUSCH. The received uplink L1 measurement report(s) 1318 received from wireless communication devices may be stored, for example, in memory 1305. The resource assignment and scheduling circuitry 1342 may further be configured to execute resource assignment and scheduling instructions (software) 1352 stored in the computer-readable medium 1306 to implement one or more of the functions described herein.

The processor 1304 may further include communication and processing circuitry 1344 configured to communicate with wireless communication devices (e.g., UEs) over a carrier frequency via respective Uu (cellular) links. In some examples, the communication and processing circuitry 1344 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 1344 may include one or more transmit/receive chains.

In some implementations where the communication involves receiving information, the communication and processing circuitry 1344 may obtain information from a component of the RAN node 1300 (e.g., from the transceiver 1310 that receives the information via radio frequency signaling or some other type of signaling suitable for the applicable communication medium), process (e.g., decode) the information, and output the processed information. For example, the communication and processing circuitry 1344 may output the information to another component of the processor 1304, to the memory 1305, or to the bus interface 1308. In some examples, the communication and processing circuitry 1344 may receive one or more of signals, messages, other information, or any combination thereof. In some examples, the communication and processing circuitry 1344 may receive information via one or more channels. In some examples, the communication and processing circuitry 1344 may include functionality for a means for receiving. In some examples, the communication and processing circuitry 1344 may include functionality for a means for processing, including a means for demodulating, a means for decoding, etc.

In some implementations where the communication involves sending (e.g., transmitting) information, the communication and processing circuitry 1344 may obtain information (e.g., from another component of the processor 1304, the memory 1305, or the bus interface 1308), process (e.g., modulate, encode, etc.) the information, and output the processed information. For example, the communication and processing circuitry 1344 may output the information to the transceiver 1310 (e.g., that transmits the information via radio frequency signaling or some other type of signaling suitable for the applicable communication medium). In some examples, the communication and processing circuitry 1344 may send one or more of signals, messages, other information, or any combination thereof. In some examples, the communication and processing circuitry 1344 may send information via one or more channels. In some examples, the communication and processing circuitry 1344 may include functionality for a means for sending (e.g., a means for transmitting). In some examples, the communication and processing circuitry 1344 may include functionality for a means for generating, including a means for modulating, a means for encoding, etc.

In some examples, the communication and processing circuitry 1344 may be configured to generate and transmit one or more RRC messages including one or more resource settings 1315 and one or more report settings 1316 to one or more wireless communication devices via the transceiver 1310. The communication and processing circuitry 1344 may further be configured to generate and transmit an activation or deactivation message (e.g., via a MAC-CE) to a wireless communication device via the transceiver 1310 to activate or deactivate a semi-persistent report setting associated with PUCCH reporting. In addition, the communication and processing circuitry 1344 may be configured to generate and transmit a trigger message (e.g., via DCI) to a wireless communication device via the transceiver 1310 to trigger an aperiodic or semi-persistent report setting associated with PUSCH reporting. Furthermore, the communication and processing circuitry 1344 may be configured to generate and transmit report information associated with an aperiodic report setting (e.g., via the DCI containing the trigger message or a different message) to a wireless communication device via the transceiver 1310 to indicate a list and/or order of beam measurements to include in an aperiodic L1 measurement report.

The communication and processing circuitry 1344 may further be configured to generate and transmit a plurality of reference signals (SSBs and/or CSI-RSs) on a plurality of beams using the antenna array 1320 and transceiver 1310. The communication and processing circuitry 1344 may further be configured to receive one or more uplink L1 measurement reports 1318 on one or more PUCCH or PUSCH from one or more wireless communication devices. The communication and processing circuitry 1344 may further be configured to execute communication and processing instructions (software) 1354 stored in the computer-readable medium 1306 to implement one or more of the functions described herein.

The processor 1304 may further include report configuration circuitry 1346, configured to select at least one resource setting 1315 and at least one report setting 1316 for a wireless communication device. In some examples, the report configuration circuitry 1346 may further be configured to select a respective information type (e.g., Type 1 or Type 2) for one or more of the report settings 1316. In some examples, the report configuration circuitry 1346 may further be configured to enable Type 1 or Type 2 for one or more of the report settings 1316 to allow the wireless communication device to transmit either Type 1 or Type 2 information in L1 measurement reports associated with the report settings 1316. In some examples, the report configuration circuitry 1346 may further be configured to enable Type 1 or Type 2 information to be sent per report setting (e.g., multiple information types may be sent in a single L1 measurement report) or per L1 measurement report (e.g., all report settings have the same information type in a single L1 measurement report). In some examples, the report configuration circuitry 1346 may further be configured to configure the wireless communication device or report settings 1316 for which Type 2 information is enabled to include differential beam measurements compared to a previous differential report setting or previous differential L1 measurement report or differential beam measurements compared to a last absolute report setting or a last absolute L1 measurement report.

In some examples, the report configuration circuitry 1346 may further be configured to select the report information for an aperiodic report setting or aperiodic L1 measurement report. For example, the report configuration circuitry 1346 may be configured to select a list and/or order of beam IDs to include in an L1 measurement report or within all L1 measurement reports associated with a particular report setting. In some examples, the list and/or order may be selected to be the same order as a last report setting utilized by the wireless communication device to generate an L1 measurement report or a last L1 measurement report of the same or a different report setting. The report configuration circuitry 1346 may further be configured to execute report configuration instructions (software) 1356 stored in the computer-readable medium 1306 to implement one or more of the functions described herein.

The processor 1304 may further include L1 measurement report processing circuitry 1348, configured to receive and process an L1 measurement report 1318 received from a wireless communication device. The L1 measurement report 1318 can include beam measurement information including beam measurements (e.g., RSRP or SINR), each corresponding to a respective beam ID. The beam ID may be, for example, a CRI or SSBRI that identifies the particular beam (e.g., ports), frequency resource, and OFDM symbol on which the reference signal (e.g., SSB or CSI-RS) may be measured by the wireless communication device. The L1 measurement report 1318 may include up to four beam IDs and corresponding beam measurements as configured in the associated report setting 1316. In some examples, the L1 measurement report 1318 may include information of a first information type (Type 1) or second information type (Type 2). A Type 1—L1 measurement report can include both the beam measurements and the respective beam ID associated with each of the beam measurements. A Type 2—L1 measurement report can include a reduced payload containing only the beam measurements.

In some examples, the L1 measurement report 1318 may include a type indicator indicating an information type (Type 1 or Type 2) for the L1 measurement report 1318 or a respective type indicator indicating a respective information type for the beam measurements associated with each report setting included in the L1 measurement report 1318. In some examples, the L1 measurement report processing circuitry 1348 may be configured to blind detect an information type associated with an L1 measurement report or respective information types associated with each set of beam measurements corresponding to a report setting included in the L1 measurement report. For example, the L1 measurement report processing circuitry 1348 may be configured to detect the information type based on a size of the PUCCH/PUSCH payload or a configuration of the PUCCH/PUSCH payload carrying the L1 measurement report 1318.

The L1 measurement report processing circuitry 1348 may further be configured to determine the respective beam IDs corresponding to each beam measurement received in a Type 2 L1 measurement report 1318. For a periodic or semi-persistent L1 measurement report 1318, the L1 measurement report processing circuitry 1348 may be configured to identify the respective beam IDs based on an order of beam IDs included in a previously received L1 measurement report 1318. For example, the L1 measurement report processing circuitry 1348 may be configured to determine that the previously received L1 measurement report or a report setting 1316 associated with the previously received L1 measurement report 1318 includes the same set of beam IDs as the current L1 measurement report 1318. In this example, the L1 measurement report processing circuitry 1348 may assume that the beam ID order in the current L1 measurement report 1318 is the same beam ID order as the previous L1 measurement report. In some examples, the previous L1 measurement report 1318 may be a differential L1 measurement report or an absolute L1 measurement report, based on the report setting 1316 for the current L1 measurement report.

For an aperiodic L1 measurement report, the L1 measurement report processing circuitry 1348 may further be configured to identify the respective beam IDs based report information provided to the wireless communication device. For example, the report information may include an explicit list and order of the beam IDs. As another example, the report information may indicate to the wireless communication device to utilize the same beam ID order as a last report setting or L1 measurement report. The L1 measurement report processing circuitry 1348 may further be configured to execute L1 measurement report processing instructions (software) 1358 stored in the computer-readable medium 1306 to implement one or more of the functions described herein.

Figure 14:
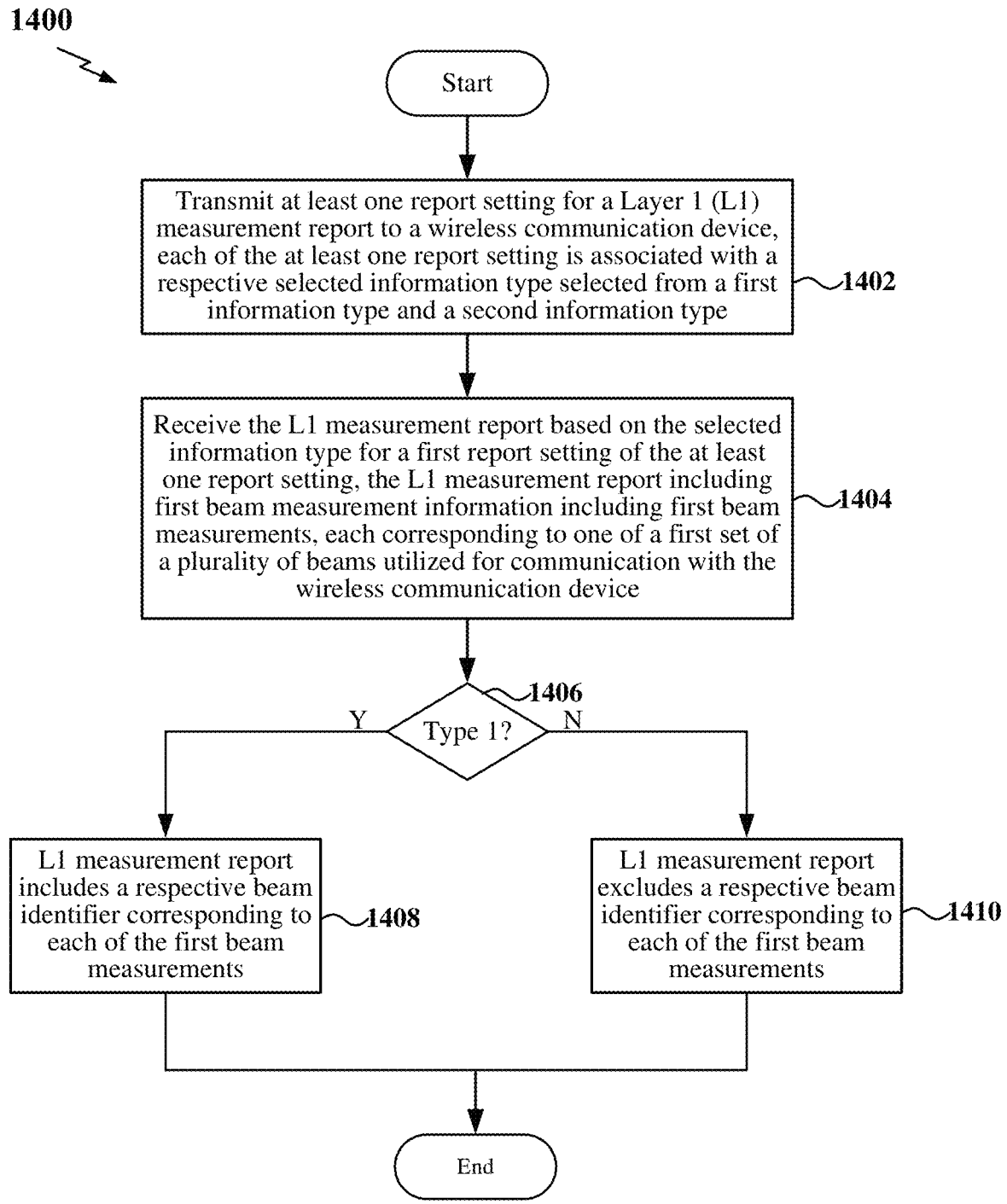
FIG. 14 is a flow chart of an exemplary method for receiving an L1 measurement report based on an information type of the L1 measurement report according to some aspects.

FIG. 14 is a flow chart 1400 of a method for receiving an L1 measurement report based on an information type of the L1 measurement report according to some aspects. As described below, some or all illustrated features may be omitted in a particular implementation within the scope of the present disclosure, and some illustrated features may not be required for implementation of all examples. In some examples, the method may be performed by the RAN node 1300, as described above and illustrated in FIG. 13, by a processor or processing system, or by any suitable means for carrying out the described functions.

At block 1402, the RAN node may transmit at least one report setting for a Layer 1 (L1) measurement report to a wireless communication device. Each of the at least one report setting can be associated with a respective selected information type selected from a first information type and a second information type. For example, the report configuration circuitry 1346, together with the communication and processing circuitry 1344 and transceiver 1310, shown and described above in connection with FIG. 13, may provide a means to transmit the at least one report setting.

At block 1404, the RAN node may receive the L1 measurement report based on the selected information type for a first report setting of the at least one report setting from the wireless communication device. The L1 measurement report can include first beam measurement information including first beam measurements, each corresponding to one of a first set of a plurality of beams utilized for communication with the wireless communication device. In some examples, the RAN node may transmit a reference signal on each of the first set of the plurality of beams. Here, each respective beam may be associated with a respective beam identifier. The respective beam identifiers may include a respective reference signal resource indicator associated with the reference signal and the respective beam. In some examples, the reference signal may include a SSB or CSI-RS. In some examples, the first beam measurement information includes a respective reference signal received power (RSRP) measurement for each of the first set of the plurality of beams or a respective signal-to-interference-plus-noise (SINR) measurement for each of the first set of the plurality of beams. For example, the L1 report processing circuitry 1348, together with the communication and processing circuitry 1344 and transceiver 1310, shown and described above in connection with FIG. 13, may provide a means to receive the L1 measurement report.

At block 1406, the RAN node may determine whether the selected information type for the first report setting associated with the L1 measurement report is the first information type (Type 1) or the second information type (Type 2). In some examples, the RAN node may determine whether the selected information type for the first report setting based on a type indicator included in the L1 measurement report. In other examples, the RAN node may blind detect the information type for the first report setting.

When the information type is Type 1 (Y branch of block 1406), at block 1408, the RAN node may determine that the L1 measurement report further includes the respective beam identifier corresponding to each of the first beam measurements. When the information type is Type 2 (N branch of block 1406), at block 1410, the RAN node may determine that the L1 measurement report excludes the respective beam identifier corresponding to each of the first beam measurements. For example, the L1 measurement report processing circuitry 1348 shown and described above in connection with FIG. 13 may provide a means to determine whether the selected information type is Type 1 or Type 2.

In some examples, the L1 measurement report is a periodic or semi-persistent L1 measurement report including Type 2 information. In this example, the first beam measurements in the first beam measurement information are arranged in a first order of the respective beam identifiers that is the same order as a previous L1 measurement report or a previous report setting of the previous L1 measurement report. In some examples, the first beam measurements in the first beam measurement information include absolute beam measurements. For example, the absolute beam measurements may include an exact value for a highest beam measurement of the first beam measurements and a respective differential value with respect to the exact value for each remaining beam measurement of the first beam measurements In other examples, the first beam measurements in the first beam measurement information include differential beam measurements with respect to a previous L1 measurement report or a previous report setting of the previous L1 measurement report. In some examples, the previous L1 measurement report includes additional differential beam measurements with respect to another previous L1 measurement report or another previous report setting. In other examples, the previous L1 measurement report includes absolute beam measurements.

In some examples, the L1 measurement report is an aperiodic L1 measurement report. In this example, the RAN node may further transmit report information associated with the first report setting to the wireless communication device. In some examples, the report information may indicate a first arrangement of the first beam measurements in the L1 measurement report in a designated order of the respective beam identifiers. In other examples, the report information may indicate a second arrangement of the first beam measurements in the L1 measurement report in a same order of the respective beam identifiers as a previous L1 measurement report or a previous report setting of the previous L1 measurement report.

In some examples, the L1 measurement report may further include second beam measurement information including second beam measurements, each corresponding to one of a second set of the plurality of beams, based on the selected information type for a second report setting of the at least one report setting. In some examples, the L1 measurement report may include the first beam measurement information and the respective beam identifier corresponding to each of the first beam measurements in response to the selected information type for the first report setting including the first information type. In addition, the L1 measurement report may further include the second beam measurement information and exclude the respective beam identifier corresponding to each of the second beam measurements in response to the selected information type for the second report setting including the second information type. In other examples, the L1 measurement report includes the first beam measurement information and excludes the respective beam identifier corresponding to each of the first beam measurements in response to the selected information type for the first report setting including the second information type. In addition, the L1 measurement report may further include the second beam measurement information and the respective beam identifier corresponding to each of the second beam measurements in response to the selected information type for the second report setting including the first information type.

In some examples, the L1 measurement report includes the first beam measurement information and the second beam measurement information in response to the selected information type for each of the first report setting and the second report setting being the same. In some examples, the L1 measurement report includes a respective type indicator corresponding to the respective selected information type for each of the first report setting and the second report setting in response to the respective selected information type for each of the first report setting and the second report setting being different. In other examples, the L1 measurement report includes a single type indicator corresponding to the respective selected information type for each of the first report setting and the second report setting in response to the respective selected information type for each of the first report setting and the second report setting being the same.

In one configuration, a radio access network (RAN) node (e.g., a base station) includes means for transmitting at least one report setting for a Layer 1 (L1) measurement report to a wireless communication device. Each of the at least one report setting is associated with a respective selected information type selected from a first information type and a second information type. The RAN node further includes means for receiving the L1 measurement report from the wireless communication device based on the selected information type for a first report setting of the at least one report setting. The L1 measurement report includes first beam measurement information including first beam measurements, each corresponding to one of a first set of a plurality of beams utilized for communication with the wireless communication device. The L1 measurement report further includes a respective beam identifier corresponding to each of the first beam measurements in response to the selected information type for the first report setting including the first information type. The L1 measurement report excludes the respective beam identifier corresponding to each of the first beam measurements in response to the selected information type for the first report setting including the second information type.

In one aspect, the aforementioned means for transmitting at least one report setting for an L1 measurement report to a wireless communication device and means for receiving the L1 measurement report based on the selected information type for a first report setting of the at least one report setting from the wireless communication device may be the processor(s) 1304 shown in FIG. 13 configured to perform the functions recited by the aforementioned means. For example, the aforementioned means for transmitting the at least one report setting may include the report configuration circuitry 1346, together with the communication and processing circuitry 1344 and transceiver 1310, shown in FIG. 13. As another example, the aforementioned means for receiving the L1 measurement report based on the first report setting from the wireless communication device may include the L1 report processing circuitry 1348, together with the communication and processing circuitry 1344 and transceiver 1310 shown in FIG. 13. In another aspect, the aforementioned means may be a circuit or any apparatus configured to perform the functions recited by the aforementioned means.

Figure 15:
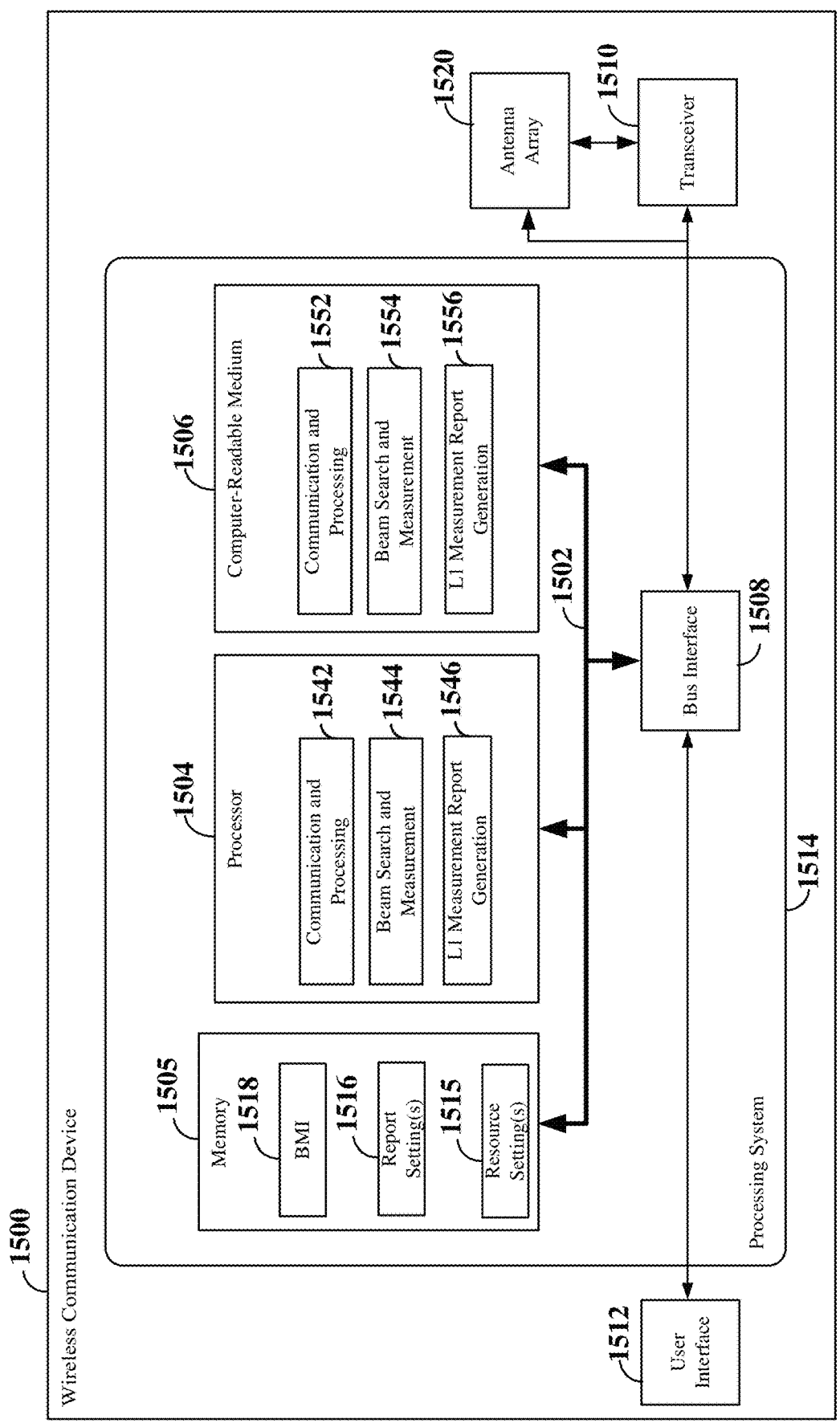
FIG. 15 is a block diagram illustrating an example of a hardware implementation for a wireless communication device employing a processing system according to some aspects.

FIG. 15 is a block diagram illustrating an example of a hardware implementation for a wireless communication device 1500 employing a processing system 1514. For example, the wireless communication device 1500 may correspond to any of the UEs or scheduled entities shown and described above in reference to FIGS. 1, 2, 4, 5, 7 and/or 12.

In accordance with various aspects of the disclosure, an element, or any portion of an element, or any combination of elements may be implemented with a processing system 1514 that includes one or more processors 1504. The processing system 1514 may be substantially the same as the processing system 1314 illustrated in FIG. 13, including a bus interface 1508, a bus 1502, memory 1505, a processor 1504, and a computer-readable medium 1506. Furthermore, the wireless communication device 1500 may include a user interface 1512, a transceiver 1510, and an antenna array 1520 substantially similar to those described above in FIG. 13. That is, the processor 1504, as utilized in a wireless communication device 1500, may be used to implement any one or more of the processes described below.

In some aspects of the disclosure, the processor 1504 may include circuitry configured for various functions. For example, the processor 1504 may include communication and processing circuitry 1542 configured to communicate with a RAN node (e.g., a base station, such as a gNB) via the transceiver 1510. The communication and processing circuitry 1542 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 1542 may be configured to exchange control information and data with the RAN node via one or more subframes, slots, and/or mini-slots.

In some examples, the communication and processing circuitry 1542 may be configured to receive one or more RRC messages including one or more resource settings 1515 (e.g., CSI resource settings) and one or more report settings 1516 (e.g., CSI report settings) from the serving RAN node via the transceiver 1510. The resource setting(s) 1515 and report setting(s) 1516 may be maintained, for example, in memory 1505 for subsequent use thereof.

The communication and processing circuitry 1542 may further be configured to receive an activation or deactivation message (e.g., via a MAC-CE) from the RAN node via the transceiver 1510 to activate or deactivate a semi-persistent report setting associated with PUCCH reporting. In addition, the communication and processing circuitry 1542 may be configured to receive a trigger message (e.g., via DCI) from the RAN node via the transceiver 1510 to trigger an aperiodic or semi-persistent report setting associated with PUSCH reporting. Furthermore, the communication and processing circuitry 1542 may be configured to receive report information associated with an aperiodic report setting (e.g., via the DCI containing the trigger message or a different message) from the RAN node via the transceiver 1510 that indicates a list and/or order of beam measurements to include in an aperiodic L1 measurement report.

The communication and processing circuitry 1542 may further be configured to receive a plurality of reference signals (SSBs and/or -RSs) on a plurality of beams using the antenna array 1520 and transceiver 1510. The communication and processing circuitry 1542 may further be configured to transmit an uplink L1 measurement report including beam measurement information (BMI) 1518 on a PUCCH or PUSCH to the RAN node. The communication and processing circuitry 1542 may further be configured to execute communication and processing instructions (software) 1552 stored in the computer-readable medium 1506 to implement one or more of the functions described herein.

The processor 1504 may further include beam search and measurement circuitry 1544, configured to control the antenna array 1520 and transceiver 1510 to search for and identify a plurality of beams during a downlink beam sweep. The beam search and measurement circuitry 1544 may further be configured to receive a respective reference signal (e.g., SSB or CSI-RS) and measure a respective RSRP, SINR, or other suitable beam measurement of the respective reference signal on each of a set of the plurality of beams identified in a report setting 1516 and associated resource setting 1515. For example, the report setting 1516 may be associated with a resource setting 1515 including a configuration of one or more resource sets, each including a plurality of beam IDs indicating the set of beams and associated reference signal resources on which to obtain the beam measurements. The obtained beam measurements may be stored as the BMI 1518 within, for example, memory 1505 for use in generating an L1 measurement report including the BMI 1518. The beam search and measurement circuitry 1544 may further be configured to execute beam search and measurement instructions (software) 1554 stored in the computer-readable medium 1506 to implement one or more of the functions described herein.

The processor 1504 may further include L1 measurement report generation circuitry 1546, configured to generate an L1 measurement report (e.g., a current L1 measurement report) based on the report setting 1516 and corresponding resource setting 1515 used to obtain the BMI 1518. The L1 measurement report generation circuitry 1546 may further operate together with the communication and processing circuitry 1542 and transceiver 1510 to transmit the current L1 measurement report to the RAN node. The current L1 measurement report can include the BMI 1518 including beam measurements (e.g., RSRP or SINR), each corresponding to a respective beam ID. The beam ID may be, for example, a CRI or SSBRI that identifies the particular beam (e.g., ports), frequency resource, and OFDM symbol on which the reference signal (e.g., SSB or CSI-RS) was measured. The current L1 measurement report may include up to four beam IDs and corresponding beam measurements as configured in the report setting 1516.

In some examples, the current L1 measurement report may include information of a first information type (Type 1) or a second information type (Type 2). A Type 1—L1 measurement report can include both the beam measurements and the respective beam ID associated with each of the beam measurements. A Type 2—L1 measurement report can include a reduced payload containing only the beam measurements. The L1 measurement report generation circuitry 1546 may further be configured to select an information type (e.g., Type 1 or Type 2) for the report setting 1516. In some examples, the selected information type may be indicated in the report setting 1516 or within report information received from the RAN node that is related to the report setting 1516 (e.g., an aperiodic report setting) or current L1 measurement report (e.g., an aperiodic L1 measurement report). For example, the report information may include an explicit list and order of the beam IDs (e.g., beam measurements corresponding to the beam IDs) to be included in a Type 2—L1 measurement report. As another example, the report information may indicate to the wireless communication device 1500 to utilize the same beam ID order for a Type 2—L1 measurement report as a last report setting or last L1 measurement report transmitted to the RAN node.

In other examples, the L1 measurement report generation circuitry 1546 may select the information type based on a configuration of a previous L1 measurement report or previous report setting for the previous L1 measurement report. In this example, the current L1 measurement report may be a periodic or semi-persistent L1 measurement report and the previous L1 measurement report may be periodic, semi-persistent, or aperiodic and of any information type. For example, when the previous L1 measurement report includes (or is configured by the previous report setting to include) a same set of beam IDs (e.g., CRIs or SSBRIs) as the current L1 measurement report, the L1 measurement report generation circuitry 1546 may select the second information type (Type 2) for the selected report setting associated with the current L1 measurement report. Otherwise, the L1 measurement report generation circuitry 1546 may select the first information type (Type 1) for the selected report setting associated with the current L1 measurement report.

In examples in which the information type is selected as the second information type based on the same set of beam IDs being included in a previous L1 measurement report, the L1 measurement report generation circuitry 1546 may include, within the current L1 measurement report, the beam measurements arranged in the same order of the beam IDs as the previous L1 measurement report. In some examples, the L1 measurement report circuitry 1546 can include the absolute beam measurements (e.g., highest exact and remaining different beam values) included in the BMI 1518 in the current L1 measurement report. In other examples, the L1 measurement report generation circuitry 1546 can compare the BMI 1518 for the current L1 measurement report to the BMI of the previous L1 measurement report to generate differential beam measurement values with respect to corresponding beam measurements in the previous L1 measurement report. The L1 measurement report generation circuitry can include the differential beam measurements for each beam ID within the current L1 measurement report and store the differential beam measurements in the BMI 1518 for the current L1 measurement report. In some examples, the previous L1 measurement report may be a differential L1 measurement report or an absolute L1 measurement report, based on the report setting 1516 for the current L1 measurement report.

The L1 measurement report generation circuitry 1546 may further be configured to select a respective information type for each report setting to be included in the current L1 measurement report and populate the current L1 measurement report based on the respective information types of each of the report settings included in the current L1 measurement report. In some examples, the L1 measurement report generation circuitry 1546 may be configured to include only report settings 1516 of the same information type in the current L1 measurement report. This may be a configuration of the wireless communication device 1500 or a configuration associated with at least one report setting to be included in the current L1 measurement report. In other examples, the L1 measurement report generation circuitry 1546 may be configured to include report settings 1516 of different types within the current L1 measurement report.

In some examples, the L1 measurement report generation circuitry 1546 may further be configured to include in the current L1 measurement report a type indicator indicating an information type (Type 1 or Type 2) for the current L1 measurement report. In this example, each of the report settings 1516 included in the current L1 measurement report is associated with the same information type. The L1 measurement report generation circuitry 1546 may further be configured to include a respective type indicator indicating a respective information type for the beam measurements associated with each report setting included in the current L1 measurement report. In this example, each of the report settings 1516 included in the current L1 measurement report may be associated with the same or different information types. The L1 measurement report generation circuitry 1546 may further be configured to execute L1 measurement report generation instructions (software) 1556 stored in the computer-readable medium 1506 to implement one or more of the functions described herein.

Figure 16:
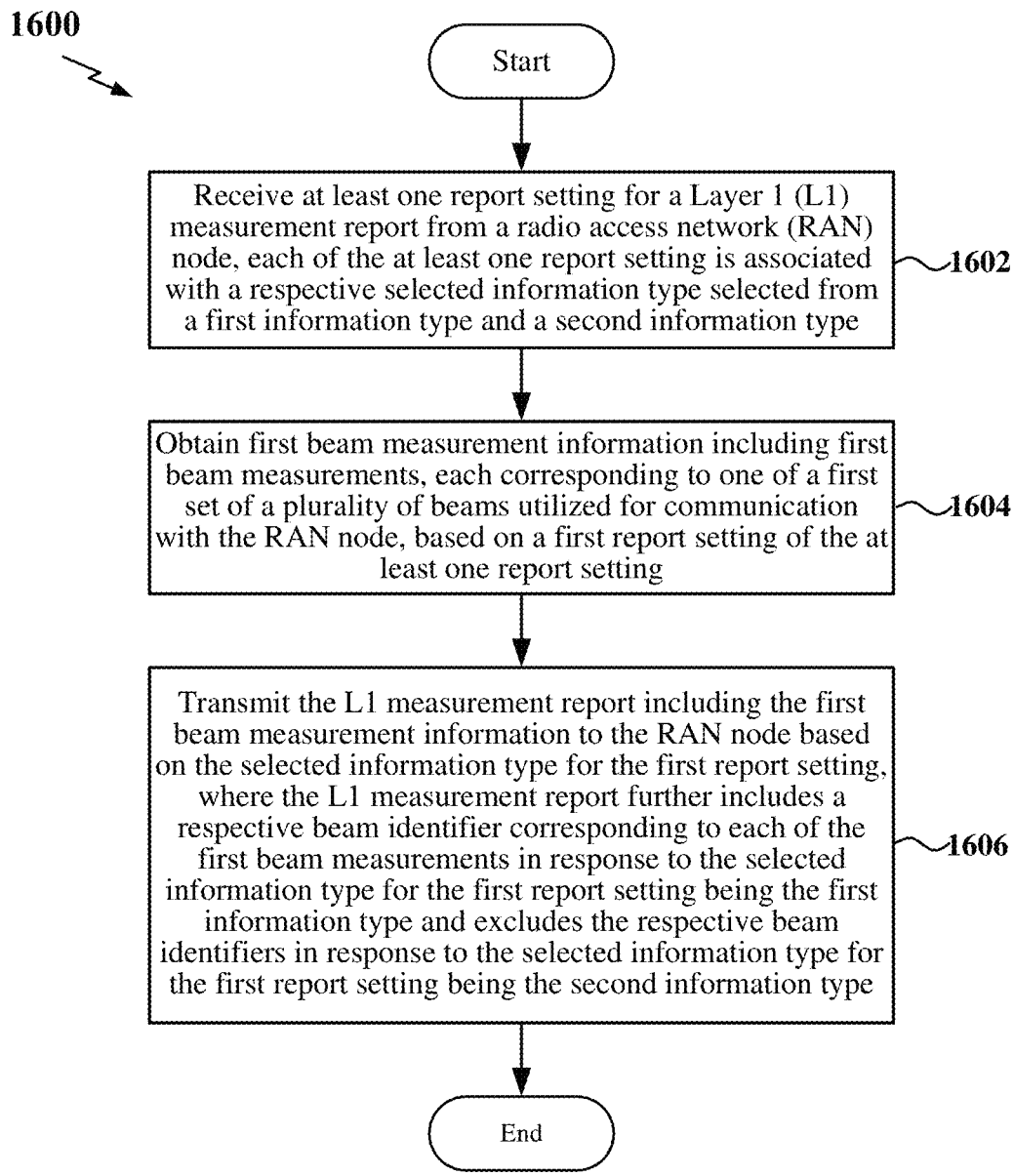
FIG. 16 is a flow chart of an exemplary method for transmitting an L1 measurement report based on an information type of the L1 measurement report according to some aspects.

FIG. 16 is a flow chart 1600 of a method for transmitting an L1 measurement report based on an information type of the L1 measurement report according to some aspects. As described below, some or all illustrated features may be omitted in a particular implementation within the scope of the present disclosure, and some illustrated features may not be required for implementation of all examples. In some examples, the method may be performed by the wireless communication device 1500, as described above and illustrated in FIG. 15, by a processor or processing system, or by any suitable means for carrying out the described functions.

At block 1602, the wireless communication device may receive at least one report setting for a Layer 1 (L1)

measurement report from a radio access network (RAN) node. Each of the at least one report setting can be associated with a respective selected information type selected from a first information type and a second information type. For example, the communication and processing circuitry 1542 and transceiver 1510, shown and described above in connection with FIG. 15, may provide a means to receive the at least one report setting.

At block 1604, the wireless communication device may obtain first beam measurement information including first beam measurements, each corresponding to one of a first set of a plurality of beams utilized for communication with the RAN node. The first beam measurement information may be based on a first report setting of the at least one report setting. In some examples, the wireless communication device may receive a reference signal on each of the first set of the plurality of beams. Here, each respective beam may be associated with a respective beam identifier. The respective beam identifiers may include a respective reference signal resource indicator (e.g., SSBRI or CRI) associated with the reference signal and the respective beam. In some examples, the reference signal may include a SSB or CSI-RS. In some examples, the first beam measurement information includes a respective reference signal received power (RSRP) measurement for each of the first set of the plurality of beams or a respective signal-to-interference-plus-noise (SINR) measurement for each of the first set of the plurality of beams. For example, the beam search and measurement circuitry 1544, together with the communication and processing circuitry 1542 and transceiver 1510, shown and described above in connection with FIG. 15, may provide a means to obtain the first beam measurement information.

At block 1606, the wireless communication device may transmit the L1 measurement report including the first beam measurement information to the RAN node based on the selected information type for the first report setting. The L1 measurement report can further include a respective beam identifier corresponding to each of the first beam measurements in response to the selected information type for the first report setting being the first information type. The L1 measurement report can further exclude the respective beam identifiers in response to the selected information type for the first report setting being the second information type. For example, the L1 measurement report generation circuitry 1546, together with the communication and processing circuitry 1542 and transceiver 1510, shown and described above in connection with FIG. 15 may provide a means to transmit the L1 measurement report to the RAN node.

In some examples, the L1 measurement report is a periodic or semi-persistent L1 measurement report including Type 2 information. In this example, the first beam measurements in the first beam measurement information are arranged in a first order of the respective beam identifiers that is the same order as a previous L1 measurement report or a previous report setting of the previous L1 measurement report. In some examples, the first beam measurements in the first beam measurement information include absolute beam measurements. For example, the absolute beam measurements may include an exact value for a highest beam measurement of the first beam measurements and a respective differential value with respect to the exact value for each remaining beam measurement of the first beam measurements. In other examples, the first beam measurements in the first beam measurement information include differential beam measurements with respect to a previous L1 measurement report or a previous report setting of the previous L1 measurement report. In some examples, the previous L1 measurement report includes additional differential beam measurements with respect to another previous L1 measurement report or another previous report setting. In other examples, the previous L1 measurement report includes absolute beam measurements.

In some examples, the L1 measurement report is an aperiodic L1 measurement report. In this example, the wireless communication device may further receive report information associated with the first report setting from the RAN node. In some examples, the report information may indicate a first arrangement of the first beam measurements in the L1 measurement report in a designated order of the respective beam identifiers. In other examples, the report information may indicate a second arrangement of the first beam measurements in the L1 measurement report in a same order of the respective beam identifiers as a previous L1 measurement report or a previous report setting of the previous L1 measurement report.

Figure 17:
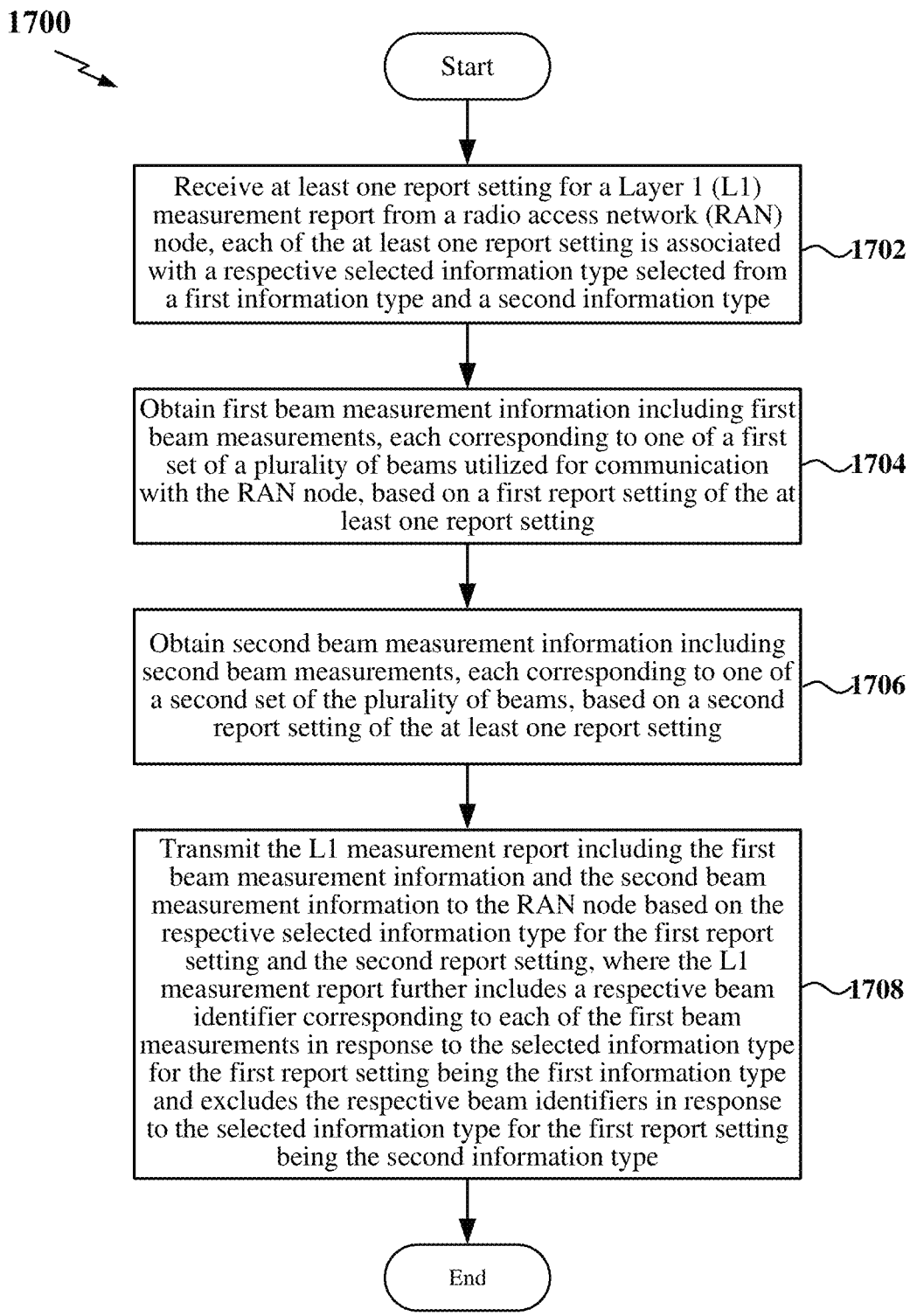
FIG. 17 is a flow chart of another exemplary method for transmitting an L1 measurement report based on an information type of the L1 measurement report according to some aspects.

FIG. 17 is a flow chart 1700 of another method for transmitting an L1 measurement report based on an information type of the L1 measurement report according to some aspects. As described below, some or all illustrated features may be omitted in a particular implementation within the scope of the present disclosure, and some illustrated features may not be required for implementation of all examples. In some examples, the method may be performed by the wireless communication device 1500, as described above and illustrated in FIG. 15, by a processor or processing system, or by any suitable means for carrying out the described functions.

At block 1702, the wireless communication device may receive at least one report setting for a Layer 1 (L1) measurement report from a radio access network (RAN) node. Each of the at least one report setting can be associated with a respective selected information type selected from a first information type and a second information type. For example, the communication and processing circuitry 1542 and transceiver 1510, shown and described above in connection with FIG. 15, may provide a means to receive the at least one report setting.

At block 1704, the wireless communication device may obtain first beam measurement information including first beam measurements, each corresponding to one of a first set of a plurality of beams utilized for communication with the RAN node. The first beam measurement information may be based on a first report setting of the at least one report setting. In some examples, the wireless communication device may receive a reference signal on each of the first set of the plurality of beams. Here, each respective beam may be associated with a respective beam identifier. The respective beam identifiers may include a respective reference signal resource indicator (e.g., SSBRI or CRI) associated with the reference signal and the respective beam. In some examples, the reference signal may include a SSB or CSI-RS. In some examples, the first beam measurement information includes a respective reference signal received power (RSRP) measurement for each of the first set of the plurality of beams or a respective signal-to-interference-plus-noise (SINR) measurement for each of the first set of the plurality of beams. For example, the beam search and measurement circuitry 1544, together with the communication and processing circuitry 1542 and transceiver 1510, shown and described above in connection with FIG. 15, may provide a means to obtain the first beam measurement information.

At block 1706, the wireless communication device may obtain second beam measurement information including second beam measurements, each corresponding to one of a second set of the plurality of beams. The second beam measurements may be obtained based on a second report setting of the at least one report setting. The second beam measurement information may be obtained in a similar manner to the first beam measurement information. For example, the beam search and measurement circuitry 1544, together with the communication and processing circuitry 1542 and transceiver 1510, shown and described above in connection with FIG. 15, may provide a means to obtain the second beam measurement information.

At block 1708, the wireless communication device may transmit the L1 measurement report including the first beam measurement information and the second beam measurement information to the RAN node based on the respective selected information type for the first report setting and the second report setting. The L1 measurement report can further include a respective beam identifier corresponding to each of the first beam measurements in response to the selected information type for the first report setting being the first information type. The L1 measurement report can further exclude the respective beam identifiers in response to the selected information type for the first report setting being the second information type. For example, the L1 measurement report generation circuitry 1546, together with the communication and processing circuitry 1542 and transceiver 1510, shown and described above in connection with FIG. 15 may provide a means to transmit the L1 measurement report to the RAN node.

In some examples, the L1 measurement report may include the first beam measurement information and the respective beam identifier corresponding to each of the first beam measurements in response to the selected information type for the first report setting including the first information type. In addition, the L1 measurement report may further include the second beam measurement information and exclude the respective beam identifier corresponding to each of the second beam measurements in response to the selected information type for the second report setting including the second information type. In other examples, the L1 measurement report may further include the first beam measurement information and exclude the respective beam identifier corresponding to each of the first beam measurements in response to the selected information type for the first report setting including the second information type. In addition, the L1 measurement report may further include the second beam measurement information and the respective beam identifier corresponding to each of the second beam measurements in response to the selected information type for the second report setting including the first information type.

In some examples, the L1 measurement report may further include the first beam measurement information and the second beam measurement information in response to the selected information type for each of the first report setting and the second report setting being the same. In some examples, the L1 measurement report may further include a respective type indicator corresponding to the respective selected information type for each of the first report setting and the second report setting in response to the respective selected information type for each of the first report setting and the second report setting being different. In other examples, the L1 measurement report may further include a single type indicator corresponding to the respective selected information type for each of the first report setting and the second report setting in response to the respective selected information type for each of the first report setting and the second report setting being the same.

In one configuration, a wireless communication device (e.g., a UE) includes means for receiving at least one report setting for a Layer 1 (L1) measurement report from a radio access network (RAN) node. Each of the at least one report setting is associated with a respective selected information type selected from a first information type and a second information type. The wireless communication device further includes means for obtaining first beam measurement information including first beam measurements, each corresponding to one of a first set of a plurality of beams utilized for communication with the RAN node, based on a first report setting of the at least one report setting. The wireless communication device further includes means for transmitting the L1 measurement report including the first beam measurement information to the RAN node based on the selected information type for the first report setting. The L1 measurement report further includes a respective beam identifier corresponding to each of the first beam measurements when the selected information type for the first report setting includes the first information type. The L1 measurement report excludes the respective beam identifier corresponding to each of the first beam measurements when the selected information type for the first report setting includes the second information type.

In one aspect, the aforementioned means for receiving the at least one report setting for the L1 measurement report, obtaining the first beam measurement information based on a first report setting, and transmitting the L1 measurement report including the first beam information may be the processor(s) 1504 shown in FIG. 15 configured to perform the functions recited by the aforementioned means. For example, the aforementioned means for receiving the at least one report setting may include the communication and processing circuitry 1542 and transceiver 1510 shown in FIG. 15. As another example, the aforementioned means for obtaining the first beam measurement information based on the first report setting may include the beam search and measurement circuitry 1544, together with the communication and processing circuitry 1542 and transceiver 1510, shown in FIG. 15. As another example, the aforementioned means for transmitting the L1 measurement report including the first beam information may include the L1 measurement report generation circuitry 1546, together with the communication and processing circuitry 1542 and transceiver 1510, shown in FIG. 15. In another aspect, the aforementioned means may be a circuit or any apparatus configured to perform the functions recited by the aforementioned means.

Figure 18:
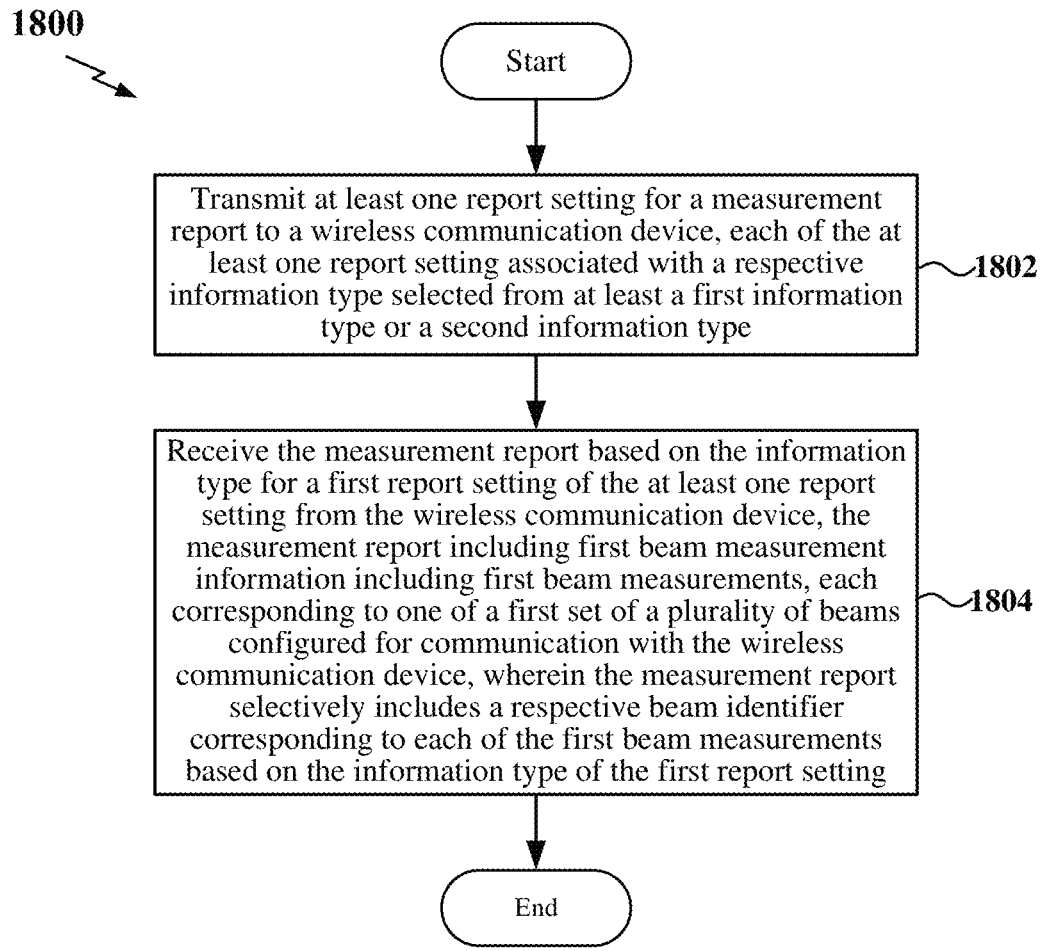
FIG. 18 is a flow chart of an exemplary method for receiving a measurement report based on an information type of the measurement report according to some aspects.

FIG. 18 is a flow chart 1800 of a method for receiving a measurement report based on an information type of the measurement report according to some aspects. As described below, some or all illustrated features may be omitted in a particular implementation within the scope of the present disclosure, and some illustrated features may not be required for implementation of all examples. In some examples, the method may be performed by the RAN node 1300, as described above and illustrated in FIG. 13, by a processor or processing system, or by any suitable means for carrying out the described functions.

At block 1802, the RAN node may transmit at least one report setting for a measurement report (e.g., an L1 measurement report) to a wireless communication device. Each of the at least one report setting can be associated with a respective information type of at least a first information type or second information type. For example, the report configuration circuitry 1346, together with the communication and processing circuitry 1344 and transceiver 1310, shown and described above in connection with FIG. 13, may provide a means to transmit the at least one report setting.

At block 1804, the RAN node may receive the measurement report based on the information type for a first report setting of the at least one report setting from the wireless communication device. The measurement report can include first beam measurement information including first beam measurements, each corresponding to one of a first set of a plurality of beams configured for communication with the wireless communication device. The measurement report can further selectively include a respective beam identifier corresponding to each of the first beam measurements based on the information type of the first report setting.

In some examples, the measurement report further includes second beam measurement information including second beam measurements, each corresponding to one of a second set of the plurality of beams, based on the information type for a second report setting of the at least one report setting. In some examples, the measurement report includes the first beam measurement information and the respective beam identifier corresponding to each of the first beam measurements in response to the information type for the first report setting including the first information type. In some examples, the measurement report further includes the second beam measurement information and excludes the respective beam identifier corresponding to each of the second beam measurements in response to the information type for the second report setting including the second information type. In other examples, the measurement report includes the first beam measurement information and excludes the respective beam identifier corresponding to each of the first beam measurements in response to the information type for the first report setting including the second information type. In some examples, the measurement report further includes the second beam measurement information and the respective beam identifier corresponding to each of the second beam measurements in response to the information type for the second report setting including the first information type.

In some examples, the measurement report includes the first beam measurement information and the second beam measurement information in response to the information type for each of the first report setting and the second report setting being the same. IN some examples, the measurement report further includes a respective type indicator corresponding to the respective information type for each of the first report setting and the second report setting in the measurement report in response to the respective information type for each of the first report setting and the second report setting being different. In some examples, the measurement report further includes a single type indicator corresponding to the respective information type for each of the first report setting and the second report setting in the measurement report in response to the respective information type for each of the first report setting and the second report setting being the same.

In some examples, the RAN node may further blind detect the information type of the measurement report. In some examples, the measurement report includes a periodic measurement report or a semi-persistent measurement report, the first beam measurements in the first beam measurement information are arranged in a first order of the respective beam identifiers, and the first order includes a same order as a previous measurement report or a previous report setting of the previous measurement report in response to the information type associated with the measurement report including the second information type.

In some examples, the measurement report includes a periodic measurement report or a semi-persistent measurement report and the first beam measurements in the first beam measurement information include differential beam measurements with respect to a previous measurement report or a previous report setting of the previous measurement report. In some examples, the previous measurement report includes additional differential beam measurements with respect to another previous measurement report or another previous report setting. In other examples, the previous measurement report includes absolute beam measurements. In some examples, the measurement report includes an aperiodic measurement report and the RAN node may further transmit report information associated with the first report setting to the wireless communication device. The report information may indicate either a first arrangement of the first beam measurements in the measurement report in a designated order of the respective beam identifiers or a second arrangement of the first beam measurements in the measurement report in a same order of the respective beam identifiers as a previous measurement report or a previous report setting of the previous measurement report. For example, the report processing circuitry 1348, together with the communication and processing circuitry 1344 and transceiver 1310, shown and described above in connection with FIG. 13, may provide a means to receive the measurement report.

In one configuration, a radio access network (RAN) node (e.g., a base station) includes means for transmitting at least one report setting for a measurement report to a wireless communication device, each of the at least one report setting associated with a respective information type selected from at least a first information type or a second information type. The RAN node further includes means for receiving the measurement report from the wireless communication device based on the information type for a first report setting of the at least one report setting. The measurement report includes first beam measurement information including first beam measurements, each corresponding to one of a first set of a plurality of beams configured for communication with the wireless communication device. The measurement report further selectively includes a respective beam identifier corresponding to each of the first beam measurements based on the information type of the first report setting.

In one aspect, the aforementioned means for transmitting at least one report setting for a measurement report to a wireless communication device and means for receiving the measurement report based on the information type for a first report setting of the at least one report setting from the wireless communication device may be the processor(s) 1304 shown in FIG. 13 configured to perform the functions recited by the aforementioned means. For example, the aforementioned means for transmitting the at least one report setting may include the report configuration circuitry 1346, together with the communication and processing circuitry 1344 and transceiver 1310, shown in FIG. 13. As another example, the aforementioned means for receiving the measurement report based on the first report setting from the wireless communication device may include the L1 report processing circuitry 1348, together with the communication and processing circuitry 1344 and transceiver 1310 shown in FIG. 13. In another aspect, the aforementioned means may be a circuit or any apparatus configured to perform the functions recited by the aforementioned means.

Figure 19:
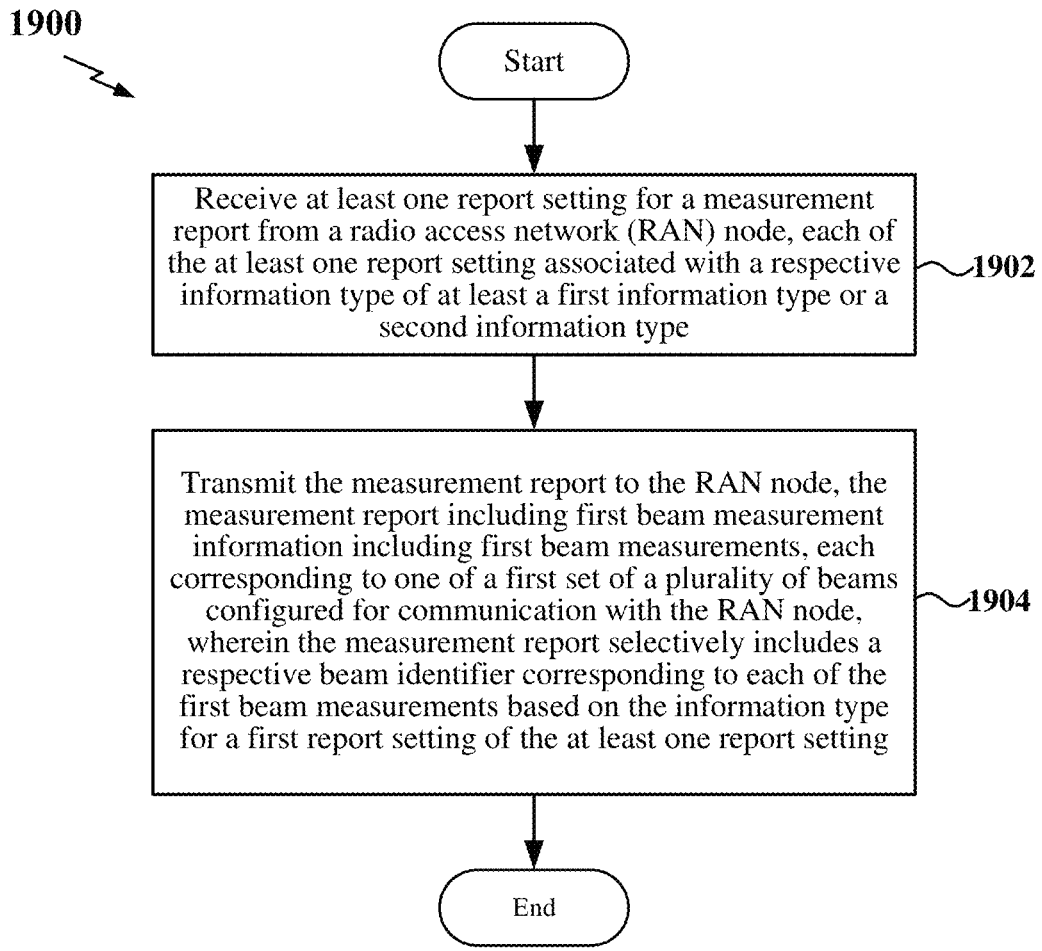
FIG. 19 is a flow chart of an exemplary method for transmitting a measurement report based on an information type of the measurement report according to some aspects.

FIG. 19 is a flow chart 1900 of a method for transmitting a measurement report based on an information type of the measurement report according to some aspects. As described below, some or all illustrated features may be omitted in a particular implementation within the scope of the present disclosure, and some illustrated features may not be required for implementation of all examples. In some examples, the method may be performed by the wireless communication device 1500, as described above and illustrated in FIG. 15, by a processor or processing system, or by any suitable means for carrying out the described functions.

At block 1902, the wireless communication device may receive at least one report setting for a measurement report from a radio access network (RAN) node. Each of the at least one report setting can be associated with a respective information type of at least a a first information type or a second information type. For example, the communication and processing circuitry 1542 and transceiver 1510, shown and described above in connection with FIG. 15, may provide a means to receive the at least one report setting.

At block 1904, the wireless communication device may transmit the measurement report to the RAN node. The measurement report can include first beam measurement information including first beam measurements, each corresponding to one of a first set of a plurality of beams configured for communication with the RAN node. The measurement report can further selectively include a respective beam identifier corresponding to each of the first beam measurements based on the information type for a first report setting of the at least one report setting.

In some examples, the wireless communication device may further obtain second beam measurement information including second beam measurements, each corresponding to one of a second set of the plurality of beams, based on a second report setting of the at least one report setting. The wireless communication device may further include the second beam measurement information in the measurement report. In some examples, the measurement report may include the first beam measurement information and the respective beam identifier corresponding to each of the first beam measurements in response to the information type for the first report setting including the first information type. In some examples, the measurement report further includes the second beam measurement information and excludes the respective beam identifier corresponding to each of the second beam measurements in response to the information type for the second report setting including the second information type. In other examples, the measurement report includes the first beam measurement information and excludes the respective beam identifier corresponding to each of the first beam measurements in response to the information type for the first report setting including the second information type. In some examples, the measurement report further includes the second beam measurement information and the respective beam identifier corresponding to each of the second beam measurements in response to the information type for the second report setting including the first information type.

In some examples, the measurement report includes the first beam measurement information and the second beam measurement information in response to the information type for each of the first report setting and the second report setting being the same. In some examples, the wireless communication device may further include a respective type indicator corresponding to the respective information type for each of the first report setting and the second report setting in the measurement report in response to the respective information type for each of the first report setting and the second report setting being different. In other examples, the wireless communication device may include a single type indicator corresponding to the respective information type for each of the first report setting and the second report setting in the measurement report in response to the respective information type for each of the first report setting and the second report setting being the same.

In some examples, the measurement report includes a periodic measurement report or a semi-persistent measurement report, the first beam measurements in the first beam measurement information are arranged in a first order of the respective beam identifiers, and the first order includes a same order as a previous measurement report or a previous report setting of the previous measurement report in response to the information type associated with the measurement report including the second information type. In some examples, the measurement report includes a periodic measurement report or a semi-persistent measurement report, the first beam measurements in the first beam measurement information comprise absolute beam measurements, and the absolute beam measurements comprise an exact value for a highest beam measurement of the first beam measurements and a respective differential value with respect to the exact value for each remaining beam measurement of the first beam measurements.

In some examples, the measurement report includes a periodic measurement report or a semi-persistent measurement report, and the first beam measurements in the first beam measurement information comprise differential beam measurements with respect to a previous measurement report or a previous report setting of the previous measurement report. In some examples, the previous measurement report includes additional differential beam measurements with respect to another previous measurement report or another previous report setting. In other examples, the previous measurement report includes absolute beam measurements. In some examples, the measurement report includes an aperiodic measurement report, and the wireless communication device may further receiving report information associated with the first report setting from the RAN node. The report information can indicate either a first arrangement of the first beam measurements in the measurement report in a designated order of the respective beam identifiers or a second arrangement of the first beam measurements in the measurement report in a same order of the respective beam identifiers as a previous measurement report or a previous report setting of the previous measurement report. For example, the L1 measurement report generation circuitry 1546, together with the communication and processing circuitry 1542 and transceiver 1510, shown and described above in connection with FIG. 15 may provide a means to transmit the L1 measurement report to the RAN node.

In one configuration, a wireless communication device (e.g., a UE) includes means for receiving at least one report setting for a measurement report from a radio access network (RAN) node, each of the at least one report setting associated with a respective information type of at least a first information type or a second information type. The wireless communication device further includes means for transmitting the measurement report to the RAN node. The measurement report includes first beam measurement information including first beam measurements, each corresponding to one of a first set of a plurality of beams configured for communication with the RAN node. The measurement report further selectively includes a respective beam identifier corresponding to each of the first beam measurements based on the information type for a first report setting of the at least one report setting.

In one aspect, the aforementioned means for receiving the at least one report setting for the measurement report and transmitting the measurement report including the first beam information may be the processor(s) 1504 shown in FIG. 15 configured to perform the functions recited by the aforementioned means. For example, the aforementioned means for receiving the at least one report setting may include the communication and processing circuitry 1542 and transceiver 1510 shown in FIG. 15. As another example, the aforementioned means for transmitting the measurement report including the first beam information may include the L1 measurement report generation circuitry 1546, together with the communication and processing circuitry 1542 and transceiver 1510, shown in FIG. 15. In another aspect, the aforementioned means may be a circuit or any apparatus configured to perform the functions recited by the aforementioned means.

The processes shown in FIGS. 14 and 16-19 may include additional aspects, such as any single aspect or any combination of aspects described below and/or in connection with one or more other processes described elsewhere herein.

Aspect 1: A method for wireless communication at a wireless communication device in a wireless communication network, the method comprising: receiving at least one report setting for a measurement report from a radio access network (RAN) node, each of the at least one report setting associated with a respective information type of at least a first information type or a second information type; and transmitting the measurement report to the RAN node, the measurement report comprising first beam measurement information comprising first beam measurements, each corresponding to one of a first set of a plurality of beams configured for communication with the RAN node, wherein the measurement report selectively comprises a respective beam identifier corresponding to each of the first beam measurements based on the information type for a first report setting of the at least one report setting.

Aspect 2: The method of aspect 1, further comprising: obtaining second beam measurement information comprising second beam measurements, each corresponding to one of a second set of the plurality of beams, based on a second report setting of the at least one report setting; and including the second beam measurement information in the measurement report.

Aspect 3: The method of aspect 2, wherein the measurement report comprises the first beam measurement information and the respective beam identifier corresponding to each of the first beam measurements in response to the information type for the first report setting comprising the first information type, and the measurement report further comprises the second beam measurement information and excludes the respective beam identifier corresponding to each of the second beam measurements in response to the information type for the second report setting comprising the second information type.

Aspect 4: The method of aspect 2, wherein the measurement report comprises the first beam measurement information and excludes the respective beam identifier corresponding to each of the first beam measurements in response to the information type for the first report setting comprising the second information type, and the measurement report further comprises the second beam measurement information and the respective beam identifier corresponding to each of the second beam measurements in response to the information type for the second report setting comprising the first information type.

Aspect 5: The method of aspect 2, wherein the measurement report comprises the first beam measurement information and the second beam measurement information in response to the information type for each of the first report setting and the second report setting being the same.

Aspect 6: The method of aspects 2 through 4, further comprising: including a respective type indicator corresponding to the respective information type for each of the first report setting and the second report setting in the measurement report in response to the respective information type for each of the first report setting and the second report setting being different.

Aspect 7: The method of aspect 2 or 5, further comprising: including a single type indicator corresponding to the respective information type for each of the first report setting and the second report setting in the measurement report in response to the respective information type for each of the first report setting and the second report setting being the same.

Aspect 8: The method of any of aspects 1 through 7, wherein: the measurement report comprises a periodic measurement report or a semi-persistent measurement report, the first beam measurements in the first beam measurement information are arranged in a first order of the respective beam identifiers, and the first order comprises a same order as a previous measurement report or a previous report setting of the previous measurement report in response to the information type associated with the measurement report comprising the second information type.

Aspect 9: The method of any of aspects 1 through 7, wherein: the measurement report comprises a periodic measurement report or a semi-persistent measurement report, the first beam measurements in the first beam measurement information comprise absolute beam measurements, and the absolute beam measurements comprise an exact value for a highest beam measurement of the first beam measurements and a respective differential value with respect to the exact value for each remaining beam measurement of the first beam measurements.

Aspect 10: The method of any of aspects 1 through 7, wherein: the measurement report comprises a periodic measurement report or a semi-persistent measurement report, and the first beam measurements in the first beam measurement information comprise differential beam measurements with respect to a previous measurement report or a previous report setting of the previous measurement report.

Aspect 11: The method of aspect 10, wherein: the previous measurement report comprises additional differential beam measurements with respect to another previous measurement report or another previous report setting.

Aspect 12: The method of aspect 10, wherein the previous measurement report comprises absolute beam measurements.

Aspect 13: The method of any of aspects 1 through 7, wherein the measurement report comprises an aperiodic measurement report and, further comprising: receiving report information associated with the first report setting from the RAN node, the report information indicating either a first arrangement of the first beam measurements in the measurement report in a designated order of the respective beam identifiers or a second arrangement of the first beam measurements in the measurement report in a same order of the respective beam identifiers as a previous measurement report or a previous report setting of the previous measurement report.

Aspect 14: A method for wireless communication at a radio access network (RAN) node in a wireless communication network, the method comprising: transmitting at least one report setting for a measurement report to a wireless communication device, each of the at least one report setting associated with a respective information type selected from at least a first information type or a second information type; and receiving the measurement report based on the information type for a first report setting of the at least one report setting from the wireless communication device, the measurement report comprising first beam measurement information comprising first beam measurements, each corresponding to one of a first set of a plurality of beams configured for communication with the wireless communication device, wherein the measurement report selectively comprises a respective beam identifier corresponding to each of the first beam measurements based on the information type of the first report setting.

Aspect 15: The method of aspect 14, wherein the measurement report further comprises second beam measurement information comprising second beam measurements, each corresponding to one of a second set of the plurality of beams, based on the information type for a second report setting of the at least one report setting.

Aspect 16: The method of aspect 15, wherein the measurement report comprises the first beam measurement information and the respective beam identifier corresponding to each of the first beam measurements in response to the information type for the first report setting comprising the first information type, and the measurement report further comprises the second beam measurement information and excludes the respective beam identifier corresponding to each of the second beam measurements in response to the information type for the second report setting comprising the second information type.

Aspect 17: The method of aspect 15, wherein the measurement report comprises the first beam measurement information and excludes the respective beam identifier corresponding to each of the first beam measurements in response to the information type for the first report setting comprising the second information type, and the measurement report further comprises the second beam measurement information and the respective beam identifier corresponding to each of the second beam measurements in response to the information type for the second report setting comprising the first information type.

Aspect 18: The method of aspect 15, wherein the measurement report comprises the first beam measurement information and the second beam measurement information in response to the information type for each of the first report setting and the second report setting being the same.

Aspect 19: The method of any of aspects 15 through 17, wherein the measurement report further comprises a respective type indicator corresponding to the respective information type for each of the first report setting and the second report setting in the measurement report in response to the respective information type for each of the first report setting and the second report setting being different.

Aspect 20: The method of aspect 15 or 18, wherein the measurement report further comprises a single type indicator corresponding to the respective information type for each of the first report setting and the second report setting in the measurement report in response to the respective information type for each of the first report setting and the second report setting being the same.

Aspect 21: The method of any of aspects 14 through 20, further comprising: blind detecting the information type of the measurement report.

Aspect 22: The method of any of aspects 14 through 21, wherein the measurement report comprises a periodic measurement report or a semi-persistent measurement report, the first beam measurements in the first beam measurement information are arranged in a first order of the respective beam identifiers, and the first order comprises a same order as a previous measurement report or a previous report setting of the previous measurement report in response to the information type associated with the measurement report comprising the second information type.

Aspect 23: The method of any of aspects 14 through 21, wherein: the measurement report comprises a periodic measurement report or a semi-persistent measurement report, the first beam measurements in the first beam measurement information comprise absolute beam measurements, and the absolute beam measurements comprise an exact value for a highest beam measurement of the first beam measurements and a respective differential value with respect to the exact value for each remaining beam measurement of the first beam measurements.

Aspect 24: The method of any of aspects 14 through 21, wherein: the measurement report comprises a periodic measurement report or a semi-persistent measurement report, the first beam measurements in the first beam measurement information comprise differential beam measurements with respect to a previous measurement report or a previous report setting of the previous measurement report.

Aspect 25: The method of aspect 24, wherein the previous measurement report comprises additional differential beam measurements with respect to another previous measurement report or another previous report setting.

Aspect 26: The method of aspect 24, wherein the previous measurement report comprises absolute beam measurements.

Aspect 27: The method of any of aspects 14 through 21, wherein the measurement report comprises an aperiodic measurement report, and further comprising: transmitting report information associated with the first report setting to the wireless communication device, the report information indicating either a first arrangement of the first beam measurements in the measurement report in a designated order of the respective beam identifiers or a second arrangement of the first beam measurements in the measurement report in a same order of the respective beam identifiers as a previous measurement report or a previous report setting of the previous measurement report.

Aspect 28: An apparatus in a wireless communication network comprising a transceiver, a memory, and a processor coupled to the transceiver and the memory, the processor and the memory configured to perform a method of any one of aspects 1 through 13 or aspects 14 through 27.

Aspect 29: An apparatus in a wireless communication network comprising at least one means for performing a method of any one of aspects 1 through 13 or aspects 14 through 27.

Aspect 30: A non-transitory computer-readable medium having instructions stored therein for causing one or more processors of an apparatus in a wireless communication network to perform a method of any one of aspects 1 through 13 or 14 through 27.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-19 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 4 5, 7, 12, 13, and/or 15 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communication at a wireless communication device, the method comprising:
    receiving two or more report settings for a measurement report from a radio access network (RAN) node, each of the two or more report settings being associated with a respective type of at least a first type indicating to include respective beam identifiers corresponding to beam measurements in the measurement report or a second type indicating to exclude the respective beam identifiers in the measurement report; and
    transmitting the measurement report to the RAN node, the measurement report comprising:
        first information comprising first beam measurements in accordance with a first report setting of the two or more report settings, each of the first beam measurements corresponding to one of a first set of a plurality of beams configured for communication with the RAN node, and
        second information comprising second beam measurements in accordance with a second report setting of the two or more report settings, each of the second beam measurements corresponding to one of a second set of the plurality of beams.

2. The method of claim 1, further comprising:
    obtaining the first information comprising the first beam measurements; and
    obtaining the second information comprising the second beam measurements.

3. The method of claim 1, wherein the measurement report comprises:
    the first information and the respective beam identifier corresponding to each of the first beam measurements in response to the first report setting being associated with the first type, and
    the second information excluding the respective beam identifier corresponding to each of the second beam measurements in response to the second report setting being associated with the second type.

4. The method of claim 1, wherein the respective type of each of the first report setting and the second report setting being the same.

5. The method of claim 1, wherein the measurement report further comprises:
    a respective first type indicator corresponding to the respective type for of each of the first report setting and the second report setting in response to the respective type of each of the first report setting and the second report setting being different, or
    a second type indicator corresponding to the respective type of both the first report setting and the second report setting in response to the respective type of each of the first report setting and the second report setting being the same.

6. The method of claim 1, wherein:
the measurement report comprises a periodic measurement report or a semi-persistent measurement report,
the first beam measurements in the first information are arranged in a first order of the respective beam identifiers, and
the first order comprises a same order as a previous measurement report or a previous report setting of the previous measurement report in response to the measurement report comprising the second type.

7. The method of claim 1, wherein:
the measurement report comprises a periodic measurement report or a semi-persistent measurement report,
the first beam measurements in the first information comprise absolute beam measurements, and
the absolute beam measurements comprise an exact value for a highest beam measurement of the first beam measurements and a respective differential value with respect to the exact value for each remaining beam measurement of the first beam measurements.

8. The method of claim 1, wherein:
the measurement report comprises a periodic measurement report or a semi-persistent measurement report, and
the first beam measurements in the first information comprise differential beam measurements with respect to a previous measurement report or a previous report setting of the previous measurement report.

9. The method of claim 8, wherein:
the previous measurement report comprises additional differential beam measurements with respect to another previous measurement report or another previous report setting, or the previous measurement report comprises absolute beam measurements.

10. The method of claim 1, wherein the measurement report comprises an aperiodic measurement report and, further comprising:
receiving report information associated with the first report setting from the RAN node, the report information indicating either a first arrangement of the first beam measurements in the measurement report in a designated order of the respective beam identifiers or a second arrangement of the first beam measurements in the measurement report in a same order of the respective beam identifiers as a previous measurement report or a previous report setting of the previous measurement report.

11. A method for wireless communication at a radio access network (RAN) node, the method comprising:
transmitting two or more report settings for a measurement report to a wireless communication device, each of the two or more report settings being associated with a respective type selected from at least a first type indicating to include respective beam identifiers corresponding to beam measurements in the measurement report or a second type indicating to exclude the respective beam identifiers in the measurement report; and
receiving the measurement report based on a first report setting of the two or more report settings and a second report setting of the two or more report settings from the wireless communication device, the measurement report comprising:
first information comprising first beam measurements in accordance with the first report setting, each of the first beam measurements corresponding to one of a first set of a plurality of beams configured for communication with the wireless communication device, and
second information comprising second beam measurements in accordance with the second report setting, each of the second beam measurements corresponding to one of a second set of the plurality of beams.

12. The method of claim 11, wherein: the measurement report comprises:
the first information and the respective beam identifier corresponding to each of the first beam measurements in response to the first report setting being associated with the first type, and
the second information excluding the respective beam identifier corresponding to each of the second beam measurements in response to the second report setting being associated with the second type.

13. The method of claim 11, wherein the measurement report comprises the first information and the second information in response to the respective type of each of the first report setting and the second report setting being the same.

14. The method of claim 11, wherein the measurement report further comprises:
a respective first type indicator corresponding to the respective type of each of the first report setting and the second report setting in response to the respective type of each of the first report setting and the second report setting being different, or
a second type indicator corresponding to the respective type of both of the first report setting and the second report setting in response to the respective information type of each of the first report setting and the second report setting being the same.

15. The method of claim 11, further comprising:
blind detecting the respective type associated with the first information and the second information of the measurement report.

16. The method of claim 11, wherein:
the measurement report comprises a periodic measurement report or a semi-persistent measurement report,
the first beam measurements in the first information are arranged in a first order of the respective beam identifiers, and
the first order comprises a same order as a previous measurement report or a previous report setting of the previous measurement report in response to the measurement report comprising the second type.

17. The method of claim 11, wherein:
the measurement report comprises a periodic measurement report or a semi-persistent measurement report,
the first beam measurements in the first information comprise absolute beam measurements, and
the absolute beam measurements comprise an exact value for a highest beam measurement of the first beam measurements and a respective differential value with respect to the exact value for each remaining beam measurement of the first beam measurements.

18. The method of claim 11, wherein:
the measurement report comprises a periodic measurement report or a semi-persistent measurement report,
the first beam measurements in the first information comprise differential beam measurements with respect to a previous measurement report or a previous report setting of the previous measurement report.

19. The method of claim 18, wherein:
the previous measurement report comprises additional differential beam measurements with respect to another previous measurement report or another previous report setting, or
the previous measurement report comprises absolute beam measurements.

20. The method of claim 11, wherein the measurement report comprises an aperiodic measurement report, and further comprising:
transmitting report information associated with the first report setting to the wireless communication device, the report information indicating either a first arrangement of the first beam measurements in the measurement report in a designated order of the respective beam identifiers or a second arrangement of the first beam measurements in the measurement report in a same order of the respective beam identifiers as a previous measurement report or a previous report setting of the previous measurement report.

21. A wireless communication device, comprising:
a transceiver;
a memory comprising instructions; and
a processor configured to execute the instructions to cause the wireless communication device to:
receive, via the transceiver, two or more report settings for a measurement report from a radio access network (RAN) node, each of the two or more report settings being associated with a respective type of at least a first type indicating to include respective beam identifiers corresponding to beam measurements in the measurement report or a second type indicating to exclude the respective beam identifiers in the measurement report; and
transmit, via the transceiver the measurement report to the RAN node, the measurement report comprising:
first information comprising first beam measurements in accordance with a first report setting of the two or more report settings, each of the first beam measurements corresponding to one of a first set of a plurality of beams configured for communication with the RAN node, and
second information comprising second beam measurements in accordance with a second report setting of the two or more report settings, each of the second beam measurements corresponding to one of a second set of the plurality of beams.

22. The wireless communication device of claim 21, wherein the processor is further configured to cause the wireless communication device to:
obtain the first information comprising the first beam measurements; and
obtain the second information comprising the second beam measurements.

23. The wireless communication device of claim 21, wherein the measurement report comprises:
the first information and the respective beam identifier corresponding to each of the first beam measurements in response to the first report setting being associated with the first type, and
the second information excluding the respective beam identifier corresponding to each of the second beam measurements in response to the second report setting being associated with the second type.

24. The wireless communication device of claim 21, wherein the measurement report comprises the first information and the second information in response to the respective type of each of the first report setting and the second report setting being the same.

25. The wireless communication device of claim 21, wherein the measurement report further comprises:
a respective first type indicator corresponding to the respective type of each of the first report setting and the second report setting in response to the respective type for of each of the first report setting and the second report setting being different, or
a second type indicator corresponding to the respective type of both of the first report setting and the second report setting in response to the respective type of each of the first report setting and the second report setting being the same.

26. The wireless communication device of claim 21, wherein:
the measurement report comprises a periodic measurement report or a semi-persistent measurement report,
the first beam measurements in the first information comprise absolute beam measurements or differential beam measurements with respect to a previous measurement report or a previous report setting of the previous measurement report.

27. The wireless communication device of claim 21, wherein the measurement report comprises an aperiodic measurement report, and wherein the processor is further configured to cause the wireless communication device to:
receive, via the transceiver, report information associated with the first report setting from the RAN node, the report information indicating either a first arrangement of the first beam measurements in the measurement report in a designated order of the respective beam identifiers or a second arrangement of the first beam measurements in the measurement report in a same order of the respective beam identifiers as a previous measurement report or a previous report setting of the previous measurement report.

28. A radio access network (RAN) node, comprising:
a transceiver;
a memory comprising instructions; and
a processor configured to execute the instructions to cause the RAN node to:
transmit, via the transceiver, two or more report settings for a measurement report to a wireless communication device, each of the two or more report settings associated with a respective type selected from at least a first type indicating to include respective beam identifiers corresponding to beam measurements in the measurement report or a second type indicating to exclude the respective beam identifiers in the measurement report; and
receive, via the transceiver, the measurement report based on a first report setting of the two or more report settings and a second report setting of the two or more report settings from the wireless communication device, the measurement report comprising:
first information comprising first beam measurements in accordance with the first report setting, each of the first beam measurements corresponding to one of a first set of a plurality of beams configured for communication with the wireless communication device, and
second information comprising second beam measurements in accordance with the second report setting, each of the second beam measurements corresponding to one of a second set of the plurality of beams.

29. The RAN node of claim 28, wherein the processor is further configured to cause the RAN node to:
blind detect the respective type associated with the first information and the second information of the measurement report.

\* \* \* \* \*